US011632291B2

(12) United States Patent
Stephens et al.

(10) Patent No.: US 11,632,291 B2
(45) Date of Patent: *Apr. 18, 2023

(54) SYSTEM FACILITATING PREDICTION, DETECTION AND MITIGATION OF NETWORK OR DEVICE ISSUES IN COMMUNICATION SYSTEMS

(71) Applicants: AT&T Mobility II LLC, Atlanta, GA (US); AT&T Intellectual Property I, L.P., Atlanta, GA (US)

(72) Inventors: Michael Stephens, Cumming, GA (US); Arthur Brisebois, Cumming, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/177,860

(22) Filed: Feb. 17, 2021

(65) Prior Publication Data

US 2021/0168025 A1 Jun. 3, 2021

Related U.S. Application Data

(63) Continuation of application No. 16/535,010, filed on Aug. 7, 2019, now Pat. No. 10,958,508, which is a
(Continued)

(51) Int. Cl.
*H04L 41/0654* (2022.01)
*H04L 43/0817* (2022.01)
(Continued)

(52) U.S. Cl.
CPC ...... *H04L 41/0672* (2013.01); *H04L 41/0663* (2013.01); *H04L 43/0817* (2013.01);
(Continued)

(58) Field of Classification Search
None
See application file for complete search history.

(56) References Cited

U.S. PATENT DOCUMENTS 5,983,364 A 11/1999 Bortcosh et al.
6,324,619 B1 * 11/2001 Raverdy ............... G06F 8/24
717/120
(Continued)

FOREIGN PATENT DOCUMENTS

CN 103902452 A 7/2014
CN 103976715 B 1/2016
(Continued)

OTHER PUBLICATIONS

Senel et al., Bio-Inspired Relay Node Placement Heuristics for Repairing Damaged Wireless Sensor Networks, IEEE Transactions on Vehicular Technology, May 2011, pp. 1835-1848, vol. 60, No. 4, 14 pages.
(Continued)

*Primary Examiner* — Hong S Cho
(74) *Attorney, Agent, or Firm* — Amin, Turocy & Watson, LLP

(57) ABSTRACT

Prediction, detection and mitigation of network or device issues in a communication system are facilitated. An embodiment can comprise: determining whether an identified problem of a device has an associated defined solution stored in a repository of information; transmitting solution information representative of the associated defined solution to the device for application of the solution information to the device in a manner determined to have less than a defined amount of impact on the device and in accordance with defined security protocols of the device; and assessing a performance of the device after application of the solution information to the device to determine whether the solution information solved the identified problem. In some embodi-
(Continued)

ments, solution detection can be performed such that based on a determination that the identified problem has been removed, the change that caused the identified problem can be determined.

20 Claims, 13 Drawing Sheets

Related U.S. Application Data continuation of application No. 15/836,564, filed on Dec. 8, 2017, now Pat. No. 10,419,274.

(51) Int. Cl.
*H04L 67/50* (2022.01)
*H04L 43/10* (2022.01)
*H04L 67/125* (2022.01)
*H04L 41/0663* (2022.01)
*H04L 67/04* (2022.01)
*H04L 67/12* (2022.01)
*H04L 41/147* (2022.01)

(52) U.S. Cl.
CPC .............. *H04L 43/10* (2013.01); *H04L 67/04* (2013.01); *H04L 67/12* (2013.01); *H04L 67/125* (2013.01); *H04L 67/535* (2022.05); *H04L 41/147* (2013.01)

(56) References Cited

U.S. PATENT DOCUMENTS

| | | | |
|---|---|---|---|
| 6,442,542 B1 | 8/2002 | Ramani et al. | |
| 6,965,901 B2 | 11/2005 | Eastham | |
| 7,194,445 B2 | 3/2007 | Chan et al. | |
| 7,206,965 B2 | 4/2007 | Roddy et al. | |
| 7,209,860 B2 | 4/2007 | Trsar et al. | |
| 7,788,002 B2 | 8/2010 | Yukawa et al. | |
| 7,962,797 B2 | 6/2011 | Goldszmidt et al. | |
| 8,024,611 B1 | 9/2011 | Meek et al. | |
| 8,082,471 B2 | 12/2011 | Khan | |
| 8,560,474 B2 | 10/2013 | Wang et al. | |
| 9,069,737 B1 | 6/2015 | Kimotho et al. | |
| 9,274,902 B1 | 3/2016 | Morley et al. | |
| 2004/0168164 A1 | 8/2004 | Shevchenko | |
| 2008/0183855 A1 | 7/2008 | Agarwal et al. | |
| 2009/0132859 A1 | 5/2009 | Pelley et al. | |
| 2015/0326611 A1 | 11/2015 | Lee et al. | |
| 2016/0239374 A1 | 8/2016 | Schnegelberger et al. | |
| 2017/0017537 A1 | 1/2017 | Razin et al. | |
| 2017/0097860 A1 | 4/2017 | Pang | |
| 2017/0249565 A1 | 8/2017 | Vichare et al. | |

FOREIGN PATENT DOCUMENTS

| | | |
|---|---|---|
| GB | 2492528 A | 1/2013 |
| KR | 100620257 B1 | 9/2006 |
| WO | 2016200298 A1 | 12/2016 |

OTHER PUBLICATIONS

Schneider et al., "Autonomous Fault Detection in Self-Healing Systems: Comparing Hidden Markov Models and Artificial Neural Networks," Jan. 2014, ACM, 8 pages.

Trobec et al., "Optimization of Diagnostic Examination," Lecture Notes in Computer Science 854, Linz 1994, pp. 761-772, Springer-Verlag, 12 pages.

Office Action for U.S. Appl. No. 15/836,564 dated Jan. 8, 2019, 21 pages.

Office Action for U.S. Appl. No. 16/535,010 dated Jul. 1, 2020, 1 pages.

\* cited by examiner

SYSTEM FACILITATING PREDICTION, DETECTION AND MITIGATION OF NETWORK OR DEVICE ISSUES IN COMMUNICATION SYSTEMS

RELATED APPLICATIONS

The subject patent application is a continuation of, and claims priority to each of, U.S. patent application Ser. No. 16/535,010 (now U.S. Pat. No. 10,958,508), filed Aug. 7, 2019, and entitled "A SYSTEM FACILITATING PREDICTION, DETECTION AND MITIGATION OF NETWORK OR DEVICE ISSUES IN COMMUNICATION SYSTEMS," which is a continuation of U.S. patent application Ser. No. 15/836,564 (now U.S. Pat. No. 10,419,274), filed Dec. 8, 2017, and entitled "A SYSTEM FACILITATING PREDICTION, DETECTION AND MITIGATION OF NETWORK OR DEVICE ISSUES IN COMMUNICATION SYSTEMS,", the entireties of which applications are hereby incorporated by reference herein.

The subject disclosure relates generally to communications systems, and, for example, to systems, methods and/or machine-readable storage media for facilitating prediction, detection and mitigation of network or device issues in a communication system.

BACKGROUND

In today's vast world of telecommunications, there is an ever-evolving network topology of different types of cellular devices that handle different densities of customers. For example, macrocell, microcell and picocell sites can be included in the same network and can service different densities of customers. Macrocell devices can have antennas greater than approximately 80 feet above ground level and whose transmitted radio frequency (RF) power is above 100 watts Equivalent Isotropically Radiated Power (EIRP). Microcell devices can have antennas approximately 80 to approximately 25 feet above ground level and whose transmitted RF power is between 100 watts and 5 watts EIRP. Picocell devices can have antennas below approximately 25 feet above ground level and whose transmitted RF power is below 5 watts EIRP. It is important to understand these three general types of sites (and correspondingly sites)—and the interaction among them to understand the future of radio networks and, thus, the embodiments described herein are important for providing such understanding and solutions to address issues resultant from these complex networks.

The network topology and/or landscape of a system can be a primary driver demanding that a network problem detection become faster and/or more automated. There are expectations that networks of tomorrow will densify and tomorrow's network demand of more calls, data and video can only be satisfied by a more densely packed network of cell sites than what is experienced in today's networks. Thus, growing network complexity and network demand can call for improved approaches to detection and/or remediation of problems.

Further, providers can have more than 100,000 cell site nodes to manage, often in uncontrolled environments more prone to failures and/or difficult to access. As radio networks densify, the number and variety of cell site nodes and uncontrolled conditions will likely increase by an order of magnitude. The increasing probability and volume of cell site node failures drives the resources for more resources to manage detection, diagnosis and correction. As systems become more complex, this makes it more difficult to match each problem with the associated cell site condition. Further, it is difficult to determine whether there has been a solution that was successful previously. Further, efforts to track, trend and timely respond to emerging conditions are labor intensive and not always perfectly accurate. Documentation and trouble handling processes therefore become inefficient, ineffective and unresponsive. This is true for the cellular communications business, medical industries and any other field where system and trouble complexity and volume exceed human capabilities to deal with them. Lastly, many other discreet variables such as specific location, specific mobile device, specific user application, specific time of day and a plethora of other operational details are not routinely captured and stored to make better optimization or diagnostic decisions.

DETAILED DESCRIPTION

Figure 1:
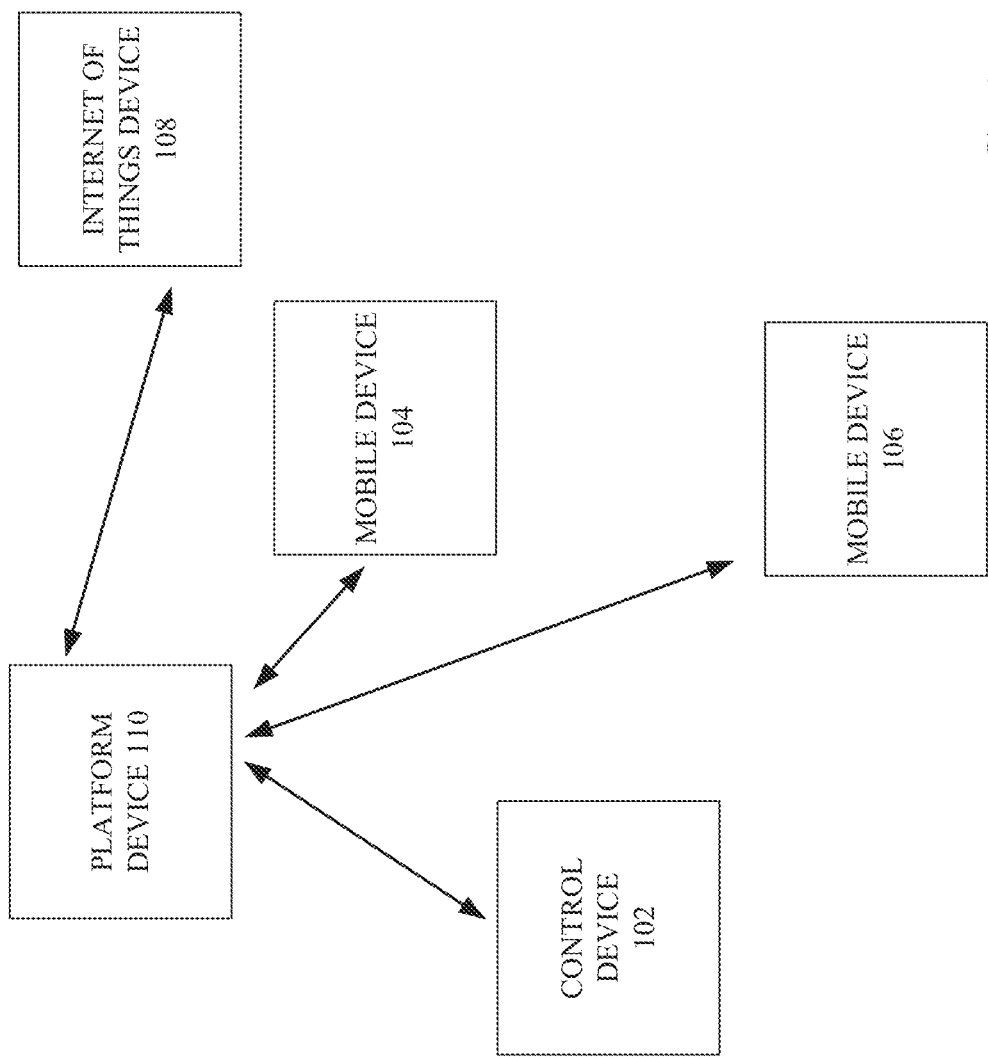
FIG. 1 illustrates an example, non-limiting block diagram of a system facilitating prediction, detection and mitigation of network or device issues in a communication system in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, a network service and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

In today's vast world of telecommunications, providers can have more than 100,000 cell site nodes to manage, often in uncontrolled environments more prone to failures and/or difficult to access. As radio networks densify, the number and variety of cell site nodes and uncontrolled conditions will likely increase by an order of magnitude. The increasing probability and volume of cell site node failures drives the resources for more resources to manage detection, diagnosis and correction. As systems become more complex, this makes it more difficult to match each problem with the associated cell site condition. Further, it is difficult to determine whether there has been a solution that was successful previously. Further, efforts to track, trend and timely respond to emerging conditions are labor intensive and not always perfectly accurate. Documentation and trouble handling processes therefore become inefficient, ineffective and unresponsive. This is true for the cellular communications business, medical industries and any other field where system and trouble complexity and volume exceed human capabilities to deal with them. Lastly, many other discreet variables such as specific location, specific mobile device, specific user application, specific time of day and a plethora of other operational details are not routinely captured and stored to make better optimization or diagnostic decisions.

One or more embodiments described herein can provide solutions to problems in complex networks and support apparatus. The embodiments described herein can provide one or more mechanisms that can automatically document failure symptoms, root cause analysis and effective solutions deployed over time. As technology is moving more towards a network of virtualized functions, an automated manner for detection of problems is desirable.

Any time a platform/system, network and/or device fails, one or more aspects described herein can search a database for a failure condition and/or symptom. As used herein the terms "fault," "symptom," "problem" and "issue" can be used interchangeably and/or can represent, in some embodiments, a state or condition or event that is undesirable and/or that can be addressed with a corrective configuration (e.g., software patch, etc.), change of operational or system parameter or the like. In some embodiments, the systems described herein can also transmit software (e.g., a corrective configuration and/or solution information to provide instructions that can be employed to update a parameter, perform a reset and/or perform a microservice update to one or more software components as opposed to an entire release) to address one or more issues. One or more embodiments can identify one or more faults and map and/or correlate the one or more faults to a solution. In one or more embodiments described herein, automated components can be provided end to end.

In some embodiments described herein, a mobile device (e.g., mobile device 106, cellular telephone) has an access methodology known as Over The Air (OTA) whereby the system operator can push (but not pull) new software updates into the cellular telephone. In some embodiments, the system 100, control device 102 and/or platform device 110 described herein might push an OTA update to the cellular telephone. Thus, while in many embodiments, the network itself is generally the target of the fix pushed by the components described herein, in some embodiments, the mobile phone itself might be the target of the fix—and that fix would be pushed to the mobile phone via the OTA interface.

Thus, in some embodiments described herein, a device (e.g., mobile device 106 or network device) can pull a corrective configuration and/or solution information from the control device 102 and/or platform device 110. By contrast, in some embodiments, the corrective configuration and/or solution information can be pushed to the mobile device 106 and/or network device. For example, the corrective configuration (e.g., software patch) and/or solution information can be pushed to the mobile device 106 and/or network device via the OTA in some embodiments.

Much has been written about knowledge management, the learning organization and cultural literacy. The embodiments described herein can be applied to each of these fields. The proposed system seeks to, to the greatest extent possible, record and generate knowledge and read knowledge with minimal human dependence and/or in a fully automated manner. One or more embodiments can employ deduction, trial and error to find and verify root cause and corrective actions. One or more embodiments seeks to, to the greatest extent possible, record and generate network data and transform it into actionable knowledge and then read this new knowledge with minimal human dependence and/or in a fully automated manner.

In one embodiment, an apparatus is provided. The apparatus can comprise: a processor; and a memory that stores executable instructions that, when executed by the processor, facilitate performance of operations, comprising: determining whether an identified problem of a device has an associated defined solution stored in a repository of information; transmitting solution information representative of the associated defined solution to the device for application of the solution information to the device in a manner determined to have less than a defined amount of impact on the device and in accordance with defined security protocols of the device; and assessing a performance of the device after the application of the solution information to the device to determine whether a corrective configuration solved the identified problem, wherein the solution information comprises the corrective configuration comprising computer executable code.

In another embodiment, a method is provided. The method comprises: determining, by a device comprising a processor, whether an identified problem of a device has an associated defined solution stored in a repository of solution information; transmitting, by the device, solution information from the repository of solution information to the device for application of the solution information to the device; and assessing, by the device, a performance of the device after the application of the solution information to the device to determine whether a corrective configuration included in the solution information solved the identified problem.

In another embodiment, a machine-readable storage medium is provided. The machine-readable storage medium can comprise executable instructions that, when executed by a processor, facilitate performance of operations, comprising: accessing an open source repository comprising a variety of solution information and respective identified problems for devices; selecting defined solution information of the variety of solution information based on an identified problem for the device and a comparison of the variety of solution information and the respective identified problems for devices; and requesting the defined solution information be transmitted to the device from a control device, wherein the defined solution information comprises a corrective configuration comprising computer executable instructions enabling resolution of the identified problem.

One or more embodiments described herein can provide an automated system to detect, request, deploy and/or verify solutions to one or more device or network issues without the need for significant human documentation and intervention. The end result is an automated self-healing expert system which is responsive, efficient and consistent. More specifically, one or more embodiments described herein can deliver benefits to systems in three tangible dimensions: 1) a perpetually growing database of known solutions can be applied to known defects faster, 2) human effort is minimized in applying the solutions—and the required skill set of the human operator is reduced and 3) the efficacy of the solution is automatically recorded and evaluated in both a fast and accurate manner, providing valuable business metrics for process control and supplier management. In some embodiments, an ONAP-enabled hardware abstraction layer can be interdependent on or interoperable with a concurrent abstraction layer.

In some embodiments, one or more embodiments can perform formal, identifiable and/or specially managed processes of Detection, Diagnosis and/or Correction inside a network or network management schema. Today, regardless of how detection, diagnosis and correction may be performed, if at all, it may be a manual process to compare the defect to a known system of information to determine if a correction is available. One or more embodiments described herein can provide for automated Detection, Diagnosis and/or Correction. Detection can take place through direct means or indirect means. In a direct Detection scenario, a straightforward capture of defined alarm conditions, Key Performance Indicator (KPI) threshold crossing alerts or other discreet conditions that can be readily trapped—these all constitute direct Detection scenarios. In an indirect Detection scenario, some level of post processing by an ONAP or other Operational Support Subsystem must take place. In this case, a synthesized alarm (sometimes known as a Soft Alarm) must be detected. Often this takes the form of the absence of a desired condition. For instance, when a node or element is carrying no traffic or a small percentage of its normal traffic for that specific time, these would be said to be synthesized or soft alarms. Other indirect Detection scenarios could be, for instance, a rolling three day average compared to a rolling thirty day baseline. Here, more gradual or minute changes can be detected. The indirect Detection method can best be understood as automating the investigative intuition of an engineer. Automated Diagnosis is even more an example of the machine instantiation of engineering skill. In the first order, the automated Diagnosis is at the very heart of the application and embodiments described herein. The very existence of a system that Detects an undesirable condition and then, as the first step of Diagnosis, checks an information source to determine if this is a known condition with a known solution is the essence of this patent application. Beyond the initial check against a known information source, Diagnosis can gather specific performance logs, execute defined test routines or even, in an extreme case, instruct operational systems to switch over to backup resources or even take itself out of service. In this case, Diagnosis is the inculcation of machine learning; it is a heuristic process that becomes more effective with each exercise, incorporating the lessons learned from that episode to inform the next episode. Automated Diagnosis then can be seen as extending on into Correction. Any effective Corrective action must be guided by accurate Diagnostic information. Automated Detection, Diagnosis and then Correction can rightly be seen as a continuum of events as opposed to three discreet steps; each step guiding the following step.

FIG. 1 illustrates an example, non-limiting block diagram of a system facilitating resource frequency management for emergency response in a communication system in accordance with one or more embodiments described herein. The system 100 can facilitate an automated method to detect, archive, assess, deploy and/or evaluate chronic defect solutions in complex networks and devices in a heuristic manner. In the embodiments described, wireless telecommunication network examples are used, but one or more embodiments of the system 100 can apply one or more aspects described herein to a number of other complex platforms and industries (e.g., medical) for which troubleshooting is employed and/or applied solutions are often repetitive.

In some embodiments, the system 100 is self-healing. Thus, the system 100 can be responsive, efficient and consistent in detecting, addressing and/or monitoring network and device problems.

As shown in FIG. 1, system 100 can comprise a control device 102 that is communicatively coupled to a platform device 110. The platform device 110 can be an open source network automation platform (ONAP) in some embodiments. In some embodiments, the ONAP can be communicatively coupled to one or more networks or network devices including, but not limited to, core network elements, devices (e.g., mobile devices) and/or BS devices.

In some embodiments, there can be an ONAP-enabled hardware abstraction layer. For example, there can be the same application programming interface (API) for the control device 102 and/or the platform device 110 regardless of any hardware for or employed in the control device 102 and/or the platform device 110. In some embodiments, the control device 102 and/or the platform device 110 can include a consolidated virtual EMS as an enabler. As such, counters, alarms and/or any particular mechanisms can apply and/or archive changes for virtual nodes.

In some embodiments, the platform device 110 can be a central aggregator of information indicative of alarm and software load configuration and/or parameters. The platform device 110 can be a platform that can receive information from one or more third-parties (e.g., devices of one or more corporations). Devices for the one or more corporations can have a platform that is open source and the platform device can be where the service logic for the device and that can enable the device resides. In some embodiments, the platform device 110 can receive input information and can also output information and/or software (e.g., corrective configurations or fixes) and/or solution information indicative one or more steps that can be taken at a device to address an issue/problem. In some embodiments, the solution information can provide instructions that can be employed to update a parameter, perform a reset and/or perform a microservice update to one or more software components as opposed to an entire release) to address one or more issues. For example, the platform device 110 can be a repository for such and/or other information as shown and discussed herein. The platform device 110 can be a knowledge engine in some embodiments. The knowledge engine can be a repository that includes information indicative of lessons learned regarding which type of corrective configuration or fix addresses one or more different problems. The solutions and lessons can then be translated from one operating system to another, from one device type to another, etc.

In some embodiments described herein, a mobile device (e.g., cellular telephone) has an access methodology known as Over The Air (OTA) whereby the system operator can push (but not pull) new software updates into the cellular telephone. In some embodiments, the system 100, control device 102 and/or platform device 110 described herein might push an OTA update to the cellular telephone. Thus, while in many embodiments, the network itself is generally the target of the fix pushed by the system 100, control device 102 and/or platform 110, in some embodiments, the mobile phone itself might be the target of the fix—and that fix would be pushed to the mobile phone via the OTA interface.

In other embodiments, the platform device 110 can be or include one or more images/copies of an operational node (e.g., mobile device, internet of things (IOTs) device) and/or information to re-generate the operational node. In the event that the operational node is damaged or destroyed, for example, in the case of natural disaster or computer hacking, the platform device 110 can re-generate the operational node and/or can setup a new operational node. Thus, in one or more embodiments, the platform device 110 can be interoperable with one or more devices or operational node.

In some embodiments, the control device 102 can determine one or more confidence factors associated with respective solutions to identified problems where the confidence factor value can be a function of the effectiveness of the solution as evaluated by the control device 102 at the time of application and/or over a defined time period. In this regard, the control device 102 can select between different solutions having different confidence factors to identify the solution likely to be most effective towards addressing the particular problem. In some embodiments, the confidence factor can be determined by the control device 102 based on the pre- and post-states of the system relative to the time of solution application.

Figure 2:
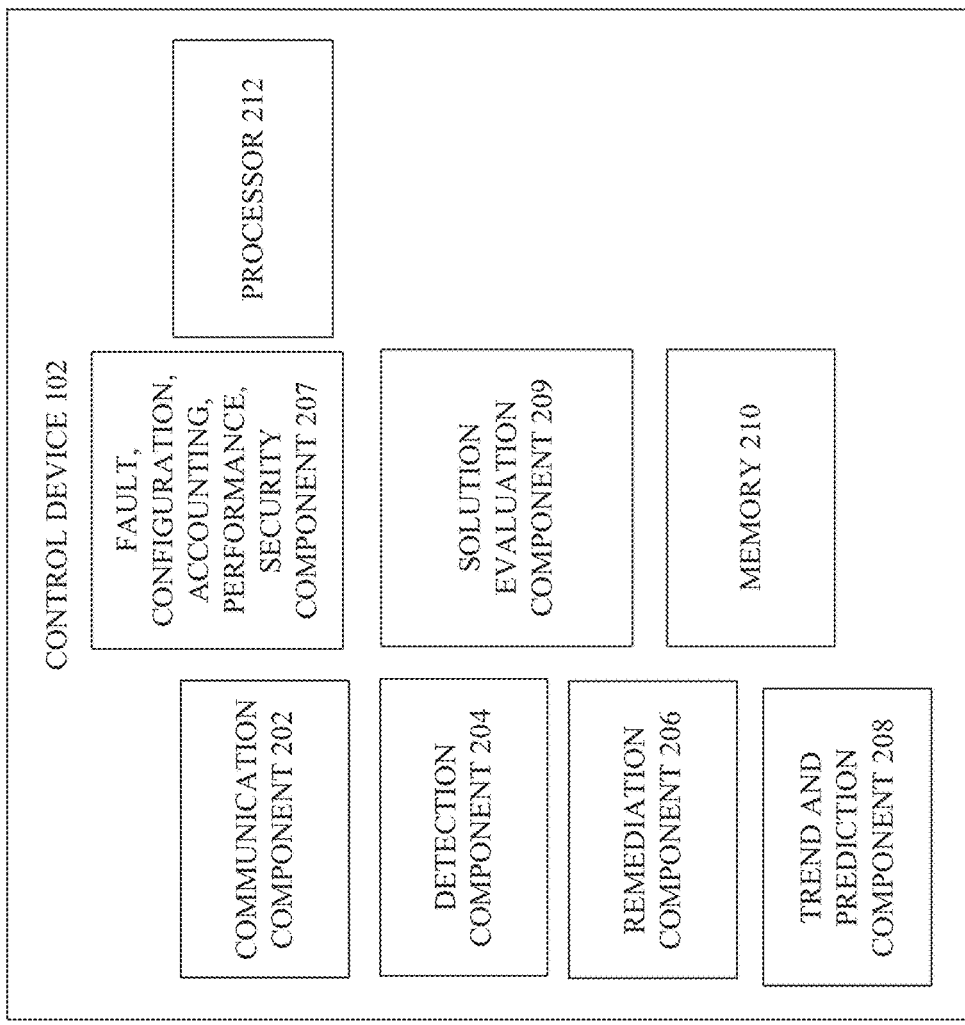
FIG. 2 illustrates an example, non-limiting block diagram of a control device that can facilitate prediction, detection and mitigation of network or device issues in a communication system in accordance with one or more embodiments described herein.
Figure 4:
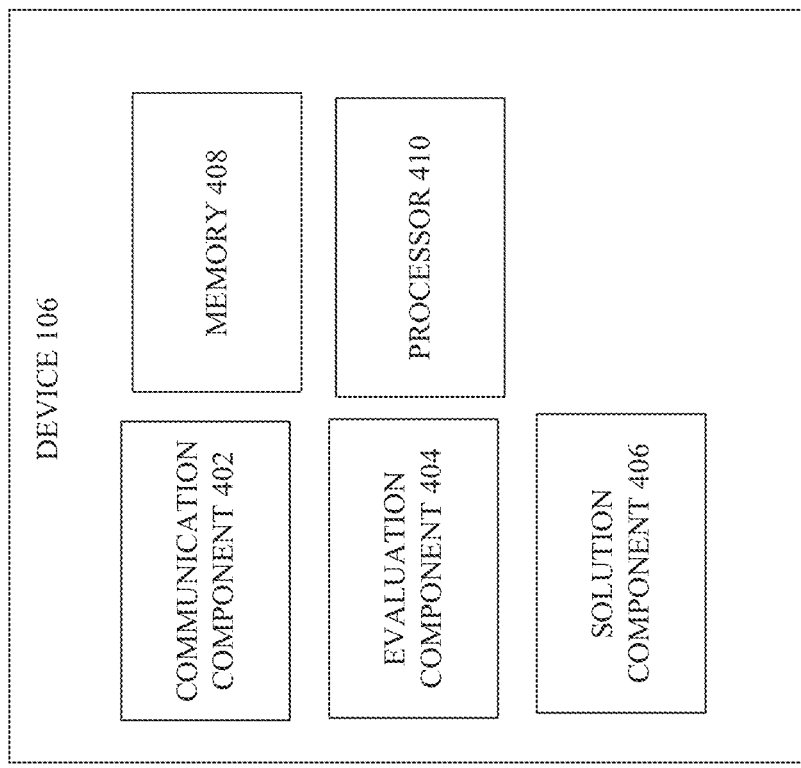
FIG. 4 illustrates an example, non-limiting block diagram of a device for which detection and mitigation of device issues can be facilitated in accordance with one or more embodiments described herein.

FIG. 2 illustrates an example, non-limiting block diagram of a control device that can facilitate prediction, detection and mitigation of network or device issues in a communication system in accordance with one or more embodiments described herein. FIG. 4 illustrates an example, non-limiting block diagram of a device for which detection and mitigation of device issues can be facilitated in accordance with one or more embodiments described herein. Repetitive description of like elements employed in other embodiments described herein is omitted for sake of brevity.

With reference to FIG. 2, the control device 102 can comprise a communication component 202, detection component 204, remediation component 206, trend and prediction component 208, fault, configuration, accounting, performance, security (FCAPS) management component 207, solution evaluation component 209, memory 210 and/or processor 212. In various embodiments, one or more of the communication component 202, detection component 204, remediation component 206, trend and prediction component 208, FCAPS management component 207, solution evaluation component 209, memory 210, and/or processor 212 can be electrically and/or communicatively coupled to one another to perform one or more functions of the control device 102. The memory 210 can store computer executable instructions that can be performed by the processor 212 to generate actions including, but not limited to, identification of one or more problems and/or solutions, generation of a control signal to cause a software fix to be deployed to a device, network device and/or a network.

As shown in FIG. 4, device 106 can comprise communication component 402, evaluation component 404 (which can record or evaluate a performance metric or a trend of performance of the mobile device 106), solution component 406, memory 408, processor 410. In some embodiments, one or more of the communication component 402, evaluation component 404 (which can record or evaluate a performance metric or a trend of performance of the mobile device 106), solution component 406, memory 408, processor 410 can be electrically and/or communicatively coupled to one another to perform one or more functions of the device 106. The memory 408 can store computer executable instructions that can be performed by the processor 410 to generate actions including, but not limited to, identification of one or more problems and/or solutions, generation of a control signal to cause a software fix to be deployed to a device, network device and/or a network.

In some embodiments, the communication component 402 can transmit to the control device 102 and/or the platform device 110 a request for a software fix and/or a problem associated with the device 106. The communication component 402 can receive and process computer executable code and/or a corrective configuration to address one or more problems and/or solution information indicative of one or more settings to which the device 106 should update, a microservice update to one or more software components as opposed to an entire software release, perform a reset (or that the device 106 should ensure it is set to such).

The evaluation component 404 can record or evaluate performance or trend of the mobile device 106 to determine that the problem exists or predict a forthcoming problem.

The solution component 406 can apply the corrective configuration to the device 106. For example, the solution component 406 can store the instructions in the corrective configuration in the memory 408 in some embodiments and such can be accessed by the processor 410 to override old settings with new settings to address the problem and/or to otherwise address the identified or forthcoming problem. In some embodiments, the instructions in the corrective configuration in the memory 408 can be employed to update a parameter, perform a reset and/or perform a microservice update to one or more software components as opposed to an entire release.

Figure 3:
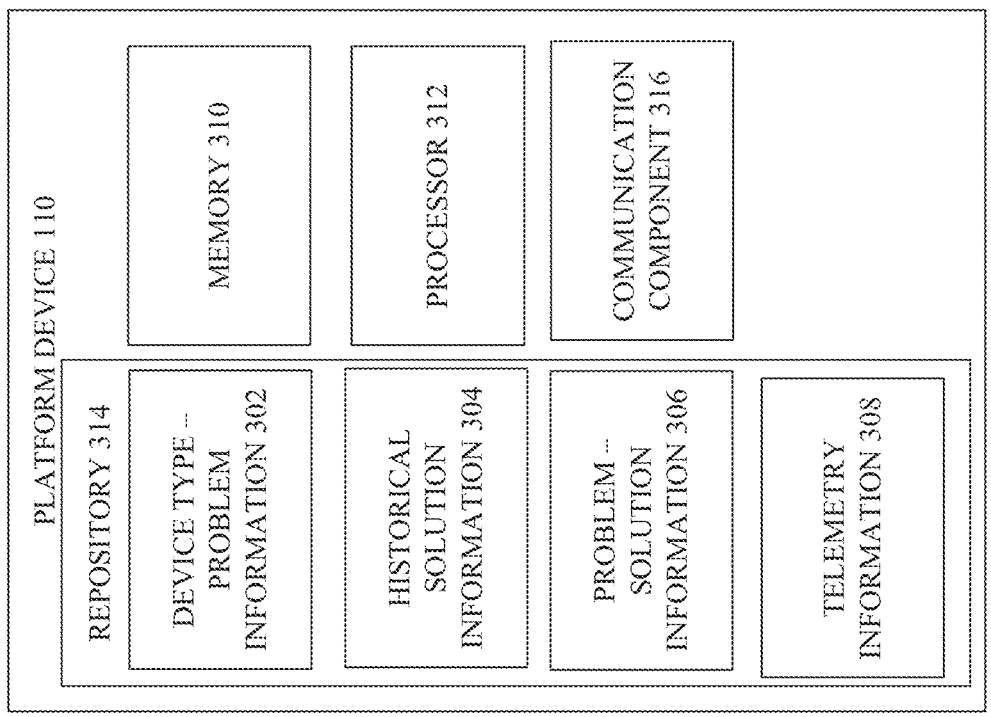
FIG. 3 illustrates an example, non-limiting block diagram of a platform device that can facilitate prediction, detection and mitigation of network or device issues in a communication system in accordance with one or more embodiments described herein.

With reference to FIGS. 1, 2, 3 and/or 4, the control device 102 can automatically and rapidly deploy/transmit software that can provide fixes to address one or more detected problems in the BS devices, network devices and/or device (e.g., device 106). The problems are conditions that can be remedied and/or improved with the application of software executable code to the BS devices, network devices and/or device. The software executable code is commonly referred to as software patches. In some embodiments, any fix, whether software executable code or otherwise, can be a corrective configuration. In some embodiments, the detection component 204 of the control device 102 can identify one or more problems, and the solution evaluation component 209 can select and/or apply a particular solution to the device and/or network device.

In some embodiments, the control device 102 and/or the platform device 110 can automatically record and/or evaluate the selected solution and/or whether the problem has been addressed and the operation or performance of the network and/or device pre- and post-application of the software solution. The performance after application of the solution can be monitored and/or recorded at defined intervals of time, based on occurrence of a condition, randomly or at a defined amount of time after the fix is applied to the device or network device.

In some embodiments, the platform device 110 can be accessible to the control device 102 to enable the control device 102 to access information regarding particular problems and solutions applied for those problems in the past. FIG. 3 illustrates an example, non-limiting block diagram of a platform device that can facilitate prediction, detection and mitigation of network or device issues in a communication system in accordance with one or more embodiments described herein. In FIG. 3, the platform device 110 can comprise a repository 314, a memory 310 and/or the processor 312. The repository 314 can comprise: device type—problem information 302, historical solution information 304 that problems information about previous problems and solutions applied and/or can store software patches (e.g., software code) that has been applied to the various problems identified. Platform device 110 can also include problem—solution information 306 and/or telemetry information 308. The platform device 110 can also comprise memory 310 and/or processor 312.

Referring back to control device 102, in some embodiments, the detection component 204 of the control device can enable the remediation component 206. For example, the detection component 204 can monitor network elements (for example BS devices) and/or network components that facilitate and/or provide Operations, Administration and Maintenance (OA&M) functions for the BS devices or network for new or repeated failure symptoms. If the detection component 204 determines that a symptom of the network or a device within the network matches a defined criterion then the detection component 204 can determine that the symptom of the network or device is a failure symptom. In some embodiments, the platform device 110 can store one or more criterion and the detection component 204 of the control device 102 can access the one or more criterion and perform an evaluation to determine if the symptom identified by the detection component 204 is a failure symptom.

In some embodiments, the cell site or network element can have all traffic automatically transferred off the mobile device or element before any remedial patching or solution information are applied. This can be known, in various embodiments, as "drying out" a node, "soft locking" a node whereby no new traffic originations are allowed on that node, no new traffic hand-ins are allowed in that node and all exiting traffic is allowed to naturally end, thus the end state is a node with no remaining traffic, but no service interruption occurred while draining off the traffic for the mobile device and/or network device.

In various embodiments, platform device 110 can store and/or catalog information indicative of a chronic failure in the repository 314. In some embodiments, platform device 110 (e.g., the communication component 316 of the platform device 110) can transmit solution information (e.g., corrective configurations can embody the solution information in some cases) to one or more devices (e.g., mobile device 104, IoT device 108) and/or receive information indicative of an identified problem or a change in a device or system that may indicate a problem. The information can be received from the control device 102 and/or one or more of a mobile device (e.g., mobile device 104) or an IoT device (e.g., IoT device 108). In some embodiments, the solution information and/or corrective configuration can be transmitted from the platform device 110 to the mobile device 104 or the IoT device 108.

In some embodiments, an IoT device can be the detector of the leading edge of recognition that a change is warranted (e.g., a problem/defect, failure condition is identified). As an example, if certain emergency conditions were established by Authorized Agencies, the cell sites in a defined area might only allow E911 calls to be originated. This capability may be requested of a network operator by law enforcement, for example, for a defined area during an emergency condition (e.g., emergency weather condition, bomb or other threat, etc.).

In some embodiments, the solution information or the information indicative of the problem can be received by the control device 102 from the mobile device 104 and/or the IoT device 108. In some embodiments, the information can be received by a device that can output a message that can be identified by another device or an operator to address the problem at the mobile device 104 or the IoT device 108. By way of example, but not limitation, the message can be an audible message, a visual message, a text message or the like. For example, upon receipt of a message (by the control device 102 and/or the platform device 110) indicating a chronic failure alarm of a device, network device or network, one or more other actions can occur in the physical world including, but not limited to, turning on a particular device to address the problem, generating a visual display showing textual, pictorial or graphical information of the problem, symptom, problems or symptoms over time or the trend in telematics or telematics at a defined time. In some embodiments, the platform device 110 and/or the control device 102 can generate a process performed by the remediation component 206 based on detection of a failure symptom.

In some embodiments, the remediation component 206 can comprise one or more tools and/or components comprised of hardware, software and/or a combination of hardware and/or software. In some embodiments, the remediation component 206 can comprise or control for deployment/transmission to a network or device, one or more scripts or computer executable (or corrective configuration) to solve and/or mitigate one or more problems at or associated with or affected by a device. In various embodiments, detection and remediation of an identified problem can take numerous different forms, dependent on the system operator, conditions during which the detection and/or remediation are to occur, the particular type of device to be remediated or the like.

In some embodiments, the remediation component 206 can operate according to one or more processes or algorithms that provide analytic and/or interventional methods to document and/or transmit information that can apply fix solutions to a network, network device and/or device (e.g., mobile device 106 or IOT device 108). If/when the algorithms and/or tools are loaded on the network, network device or device, the trend and prediction component 208 of the control device 102 can identify, monitor and/or record a performance, telematic value of one or more metrics and/or trend of the network, network device and/or device or a defined amount of time (e.g., several days, one hour, 24 hours, one week, one month). In some embodiments, the trend and prediction component 208 can identify, monitor and/or record one or more of the performance (e.g., baseline performance), telematic value of one or more metrics and/or a trend prior to the application of the patch and/or solution.

The solution evaluation component 209 can compare the pre- and post-application performance, telematic values and/or trends to determine the result of applying the patch and/or solution. In some embodiments, the trend and prediction component 208 can identify or more trends and/or monitor one or more networks, network devices or device to determine behaviors, performance and/or trends of behavior and/or performance that occurred prior to the failure symptom detection. The control device 102 and/or the platform device 110 can record and/or store such information identified/observed by the control device 102 and/or the platform device 110. In some embodiments, the information stored can be employed in the future to identify potential failure symptoms that may be forthcoming prior to the actual failure occurrence.

In some embodiments, the information can be employed by a solution detection mechanism of the control device 102 and/or the platform device 110 to determine other specific information that occurred during, before or after the occurrence of the failure. The platform device 110 and/or the control device 102 can build a database of cause and effect information over time, for a particular type of device (e.g., Apple device versus Samsung device), for a particular network, network type or network device. In some embodiments, the platform device 110 and/or the control device 102 can store and/or determine failure and/or degradation patterns of a device, network or network device. In some embodiments, the trend and prediction component 208 can utilize and/or employ such information to predict that a particular problem is forthcoming based on a trend. This prediction can be made before the problem happens and information can be generated by the trend and prediction component 208 that causes a patch to be applied that may prevent the problem from occurring thereby mitigating the occurrence of such issues/problems prior to the problem occurring.

In some embodiments, information indicative of solutions applied to a particular problem can be stored in the platform device 110 and/or the control device 102. For example, the version of the solution (e.g., version of the corrective configuration) can be stored in the platform device 110 and/or the control device 102. In another embodiments, if an identified problem was determined to be solved by a defined particular release (e.g., release 1.2), then the latest release including or following 1.2 (e.g., release 1.3, 1.4 etc.) will contain that same fix and should be applied.

In some embodiments, information such as that that would be included on a work ticket (e.g., problem symptoms and solution and/or patch applied) can be stored along with date that the issue occurred in some embodiments. As such, the trend and prediction component 208 can identify possible connections in one or more other parts of a network that may be related to the occurrence based on an overlap of time and/or date between the two occurrences. In this regard, the control device 102 and/or platform device 110 can identify cause and effect relationships between the two occurrences and/or symptoms of the two occurrences. The control device 102 and/or the platform device 110 can also determine the particular version of corrective configuration and/or solution information that resulted in the cause and/or solution of the identified problem.

In some embodiments, the control device 102 and/or the platform device 110 can detect the cause of the failure at the leading edge of the degradation. In some embodiments, the term "leading edge" can be mean a moment in time at which an onset of a condition (e.g., failure condition) or onset of a defect is being initiated, manifested or evinced. In some embodiments, the ONAP-enabled hardware abstraction layer can be employed. In some embodiments, detection of the leading edge and/or taking corresponding action to remediate the onset of the failure condition and/or the defect can be performed by the platform device 110 and/or the control device 102 invoking one or more actions or solutions, by a self-optimizing or self-healing algorithm being invoked. In some embodiments, a component performing the self-optimizing and/or self-healing algorithm can be included within, interdependent and/or interoperable with the platform device 110 and/or control device 102.

In some embodiments, the control device 102 and/or platform device 110 and/or mobile device or network device can evaluate a new software that may have bugs or other errors in code or execution. The bugs or errors can be detected and/or the result of the bugs or errors can also be detected. For example, in some embodiments, the control device 102, platform device 110 can determine that the bugs or error caused a new chronic signature and/or set of events associated with or indicative of a failure event. Based on the detection of the bug and/or error (or based on the determination that the bugs or error caused a new chronic signature and/or set of events associated with or indicative of a failure event) the control device 102 and/or platform device 110 can stop additional deployment of the software and/or in some embodiments, initiate fallback or return to prior software (or a prior software version) that did not have the chronic signature/issue/failure condition.

In some embodiments, one or more devices and/or network devices can continually discover problems and interoperability issues (in some cases, that were never discovered). Other operators may also discover the problems. A continual stream of corrective configurations can be transmitted from the platform device 110 to the devices, network devices and/or network. Accordingly, one or more embodiment of the system described herein can provide for the device (e.g., mobile device 104, IoT device 108), network device, control device 102 and/or platform device 110 to reference the repository 314 for a solution to the problem. The patch can be requested and/or retrieved and setup by the device or network device, and these devices can also monitor themselves to determine if the problem has been fixed. In some embodiments, the control device 102 and/or the platform device 110 can transmit and/or the patch, and determine if the problem has been fixed. If the problem has not been fixed, the process of selecting a new solution can occur. This can be an iterative process to find a solution that resolves the problem. Accordingly, one or more embodiments described herein can automate detection of the problem and streamline the flagging of a problem that has not been resolved.

In some embodiments, network security and/or shielding of known network defects from third-parties (e.g., competitors or belligerents/hackers) can be provided. For example, in some embodiments, access to the repository can be protected and/or limited to only selected parties or devices that may be preapproved and/or have secure credentials such that the defects and/or past failure conditions of a particular mobile device or network device may not be known to any unintended or unauthorized parties.

The portion of the repository 314 that indicates the problem can be updated to indicate that the software applied solves (or at least mitigates) the problem.

In some embodiments, upon receipt of a request for a patch, the control device 102 and/or platform device 110 can determine whether there is an error in the requested software or requested version of the software. If there is an error or bug detected, the control device 102 and/or platform device 110 can generate a message declining to transmit the requested software or software version, sending a substitute corrective configuration or software version or any number of other fixes.

In some embodiments, an ecosystem including mobile devices, IoT devices and/or network devices can interact to create problems for the network and a solution can be applied to the devices in the network or to an aspect of the network to affect the devices in the ecosystem to remove or mitigate a problem (or forthcoming problem likely to arise). In some embodiments, the network can have a solution for one or more devices in the network and such information can be stored in the repository 314 since the repository 314 can be accessed by one or more third-party devices since the repository 314 is an open source database.

In some embodiments describe herein, a network service might also be a triggering element for a fault condition that can be detected and/or remediated by the platform device 110 and/or the control device 102. As used herein, the term "network service" can mean a service the network provides. These may be voice services, where, for instance, if voice echo or voice imperfections manifest themselves, the system, control device 102 and/or platform device 110 can detect the presence of these voice imperfections and this can be an example of a leading edge trigger that can cause the control device 102 and/or the platform device 110 to determine if a fix is available for these particular voice imperfections. Streaming video is another example of a network service. If the streaming video, as an example, starts experiencing pixilation, freeze or other video imperfections, the control device 102 and/or platform device 110 can be triggered to determine is a fix is available.

Accordingly, in some embodiments, one or more elements of network service might be, but is not limited to, data throughput speeds, voice fidelity/intelligibility, responsiveness/latency. While all these have various key performance indicators (KPI) can measured and/or managed, the network service can be an identifiable element transcendent of the KPI proper. Accordingly, triggers, as described herein, can be broadened beyond the triggers that can be used the control device 102 and/or platform device 110 operation can be broadened to not be exclusively hard triggers such as alarms, KPI or other FCAPS criteria and include more soft triggers as well.

In some embodiments, one or more network service providers or other participants in a network (e.g., telecommunications network, hospital network, automotive network, social media network) can access and read or write to the repository and/or request a software fix from the repository 314.

In some embodiments, in a telecommunications example of the system, different mobility service providers can track and/or store in the repository 314 different types of information such as: telemetry information (e.g., bit error rates, link rates) for the network or devices in the network, cell site information, information regarding software errors/bugs/glitches in particular devices or particular operating systems of devices. In some embodiments, the platform device 110 or the repository 314 of the platform device can access one or more other knowledge engines associated with a mobility service provider to retrieve information from the other knowledge information that is then stored in the repository 314. In some embodiments, the mobility service provider can send the information to ONAP and it can be stored in the repository 314.

The problems for which a fix can be provided can be based on fault management (alarms), capacity management, access management, security management or the like for the device, network device and/or network. By way of example, but not limitation, a security issue can be a loophole that allows a hacker to access a device or network. For example, in some embodiments, the FCAPS component 207 can identify and/or address one or more fault, capacity, access and/or security problems for a device, network device or network.

In some embodiments, the control device 102 and/or the platform device 110 can provide self-healing and/or self-optimizing. For example, the self-optimizing can be provided if the control device 102 and/or the platform device 110 can determine and/or predict what solutions have been applied for a defined number of cases (or a defined percentage of cases of a particular problem) then such solution can be applied (if greater than a defined percentage or number of times). In some embodiments, if the device, network or network device fails and no previous solutions address the problem the embodiments herein can be self-healing by providing new solutions.

In some embodiments, the control device 102 and/or platform device 110 can generate one or more confidence factors or values of one or more confidence factors. The confidence factors can be calculated to indicate a likelihood that a particular software is better or worse at handling a defined problem. For example, for a set of symptoms, there can be numerous possible software solutions from which the control device 102 and/or the platform device 110 can choose. The different software solutions can have different confidence factor values indicating the likelihood that the software will address/fix and/or mitigate the symptoms. Thus, a piece of software can have different confidence factor values for different sets of symptoms. The confidence factor value can be set based on the trend and prediction component 208 monitoring how well the software worked on prior occasions to address/fix and/or mitigate the symptoms in some embodiments. In other embodiments, the confidence factor value can be based on success rate—probability of improvement in deploying a first software versus a second software. In some embodiments, the control device 102 and/or the platform device 110 can select the software that has the highest confidence factor value for the particular set of symptoms (or for a subset of the symptoms). In some embodiments, the cost of using that particular software can be weighed against the confidence factor value and a tradeoff can be made. In some embodiments, self-learning can be employed to select between different software.

In some embodiments, the control device 102 can determine whether the symptoms of a device, network and/or network device indicate normal (or average) operations or telematics in some cases and in other cases that the device, network and/or network device operates in an abnormal (or non-average) operations or telematics. The determination can be made based on one or more factors.

In some embodiments, a particular event can be known in advance to occur in the future. In some embodiments, an event-based problem (e.g., holiday, etc.) can occur, a time of day-based problem can occur, a device-specific problem, a location-specific (e.g., stadium at the Superbowl) problem and/or a time-specific can occur.

In some embodiments, the control device 102 can include an FCAPS management component 207 that can monitor and/or detect and/or mitigate problems or issues having to do with performance, fault management, capacity management (excess capacity concerns), security management (security breach concerns).

In some embodiments, the remediation component 206 can comprise one or more policies (e.g., software policies or otherwise) and methods and/or algorithms to augment or replace various analytic and/or intervention methods used to evaluate and/or instantiate fix solutions. In some embodiments, the detection component 204 and/or the platform device 110 can comprise an automated component that can detect and/or catalog known fixes to chronic symptoms.

In some embodiments, the detection component 204 and/or the platform device 110 can transmit to and/or fill one or more aspects of the repository 314 with information or computer executable code that is a known or anticipated fix for other network components and/or devices or the platform device 110 and/or control device 102 from which to choose. For example, when a device 106 has a chronic issue that suddenly disappears, the control device 102, platform device 110 and/or evaluation component 404 of device 106 can have an algorithm that identifies and/or catalogs all (or, in some embodiments, one or more of) the changes that occurred within a defined amount of time before or after the time the chronic problem disappeared. For instance, in some embodiments, if a remote radio head (RRH) reset chronic problem disappears at a First Field Application (FFA) new software test at a BS device when or after an FFA software load is applied, then identifying information for the particular chronic symptom and information fix/software code and/or patch can be automatically captured by the control device 102, platform device and/or BS device and/or written to the platform device 110 and/or one or more components of the repository 314 during the FFA. Such operations can be considered a self-healing aspect of the system 100. Thus, system 100 can be a self-healing network. After the solution is applied, other BS devices (most outside the FFA test area) can match their chronic symptom with this pending fix, and place themselves in the remediation component 206 queue.

Before the software (with fix) is provided as generally available, the system 100 can have a ready and prioritized list of devices to which to provide deployment.

Figure 5:
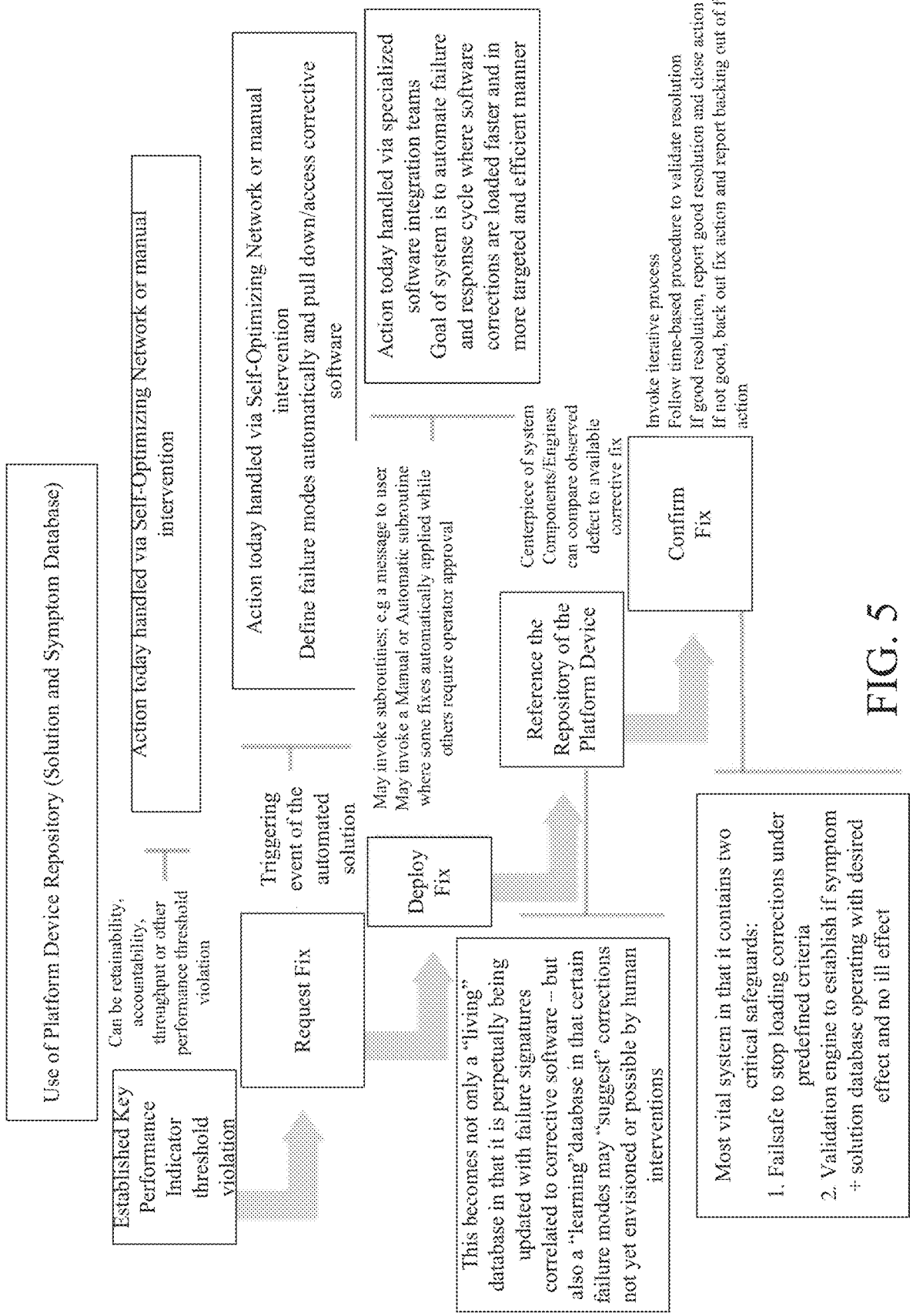
FIG. 5 illustrates an example, non-limiting block diagram of a system facilitating prediction, detection and mitigation of network or device issues in a communication system in accordance with one or more embodiments described herein.
Figure 6:
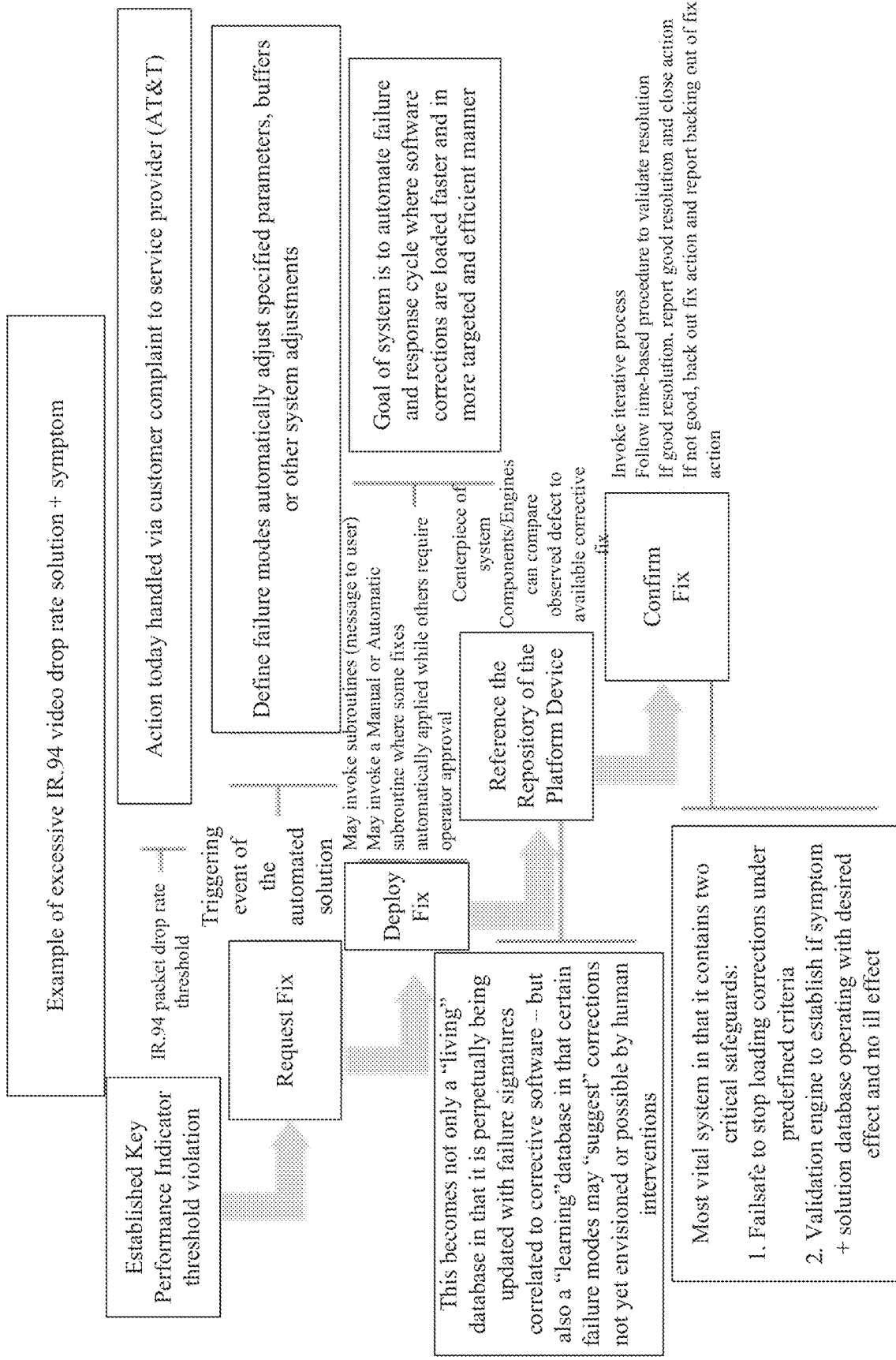
FIG. 6 illustrates an example, non-limiting block diagram of a system facilitating prediction, detection and mitigation of network or device issues in a communication system in accordance with one or more embodiments described herein.

FIG. 5 illustrates an example, non-limiting block diagram of a system facilitating prediction, detection and mitigation of network or device issues in a communication system in accordance with one or more embodiments described herein. FIG. 6 illustrates an example, non-limiting block diagram of a system facilitating prediction, detection and mitigation of network or device issues in a communication system in accordance with one or more embodiments described herein. Repetitive description of like elements employed in other embodiments described herein is omitted for sake of brevity.

One or more of the functions of the operations shown and/or described in FIGS. 5 and/or 6 can be performed by control device 102 and/or platform device 110 (or a component of control device 102 and/or platform device 110). The intelligence of the control device 102 and/or the platform device 110 can be provided in at least three forms: one or more processes or subcomponents that can confirm that a fix applied to a device, network device or network is successful, one or more processes or subcomponents that can request a fix to be applied to a device, network device and/or network; and/or one or more processes or subcomponents that can transmit/deploy one or more corrective configurations or analysis processes to provide troubleshooting and/or a fix deployment process.

In some embodiments, confirming the fix can be provided as follows. If a network device (e.g., BS device), network and/or device has a chronic issue (for instance, RRH restarts with a particular software code execution), dropped calls are occurring under certain radio frequency (RF) link conditions, BS device baseband unit (BBU) undergoing excessive internal restarts, etc. and that chronic issue resolves/disappears, then the control device 102 and/or platform device 110 can search for the change that was applied by the control device 102 and/or the platform device 110 just prior to the resolution/disappearance of the issue and thus correlates with the chronic issue resolution/disappearance. For example, the search can be performed of the repository 314 of information provided in the platform device 110. By way of example, but not limitation, the information can be the solution information portion of the problem-solution information 306 stored in platform device 110.

The change identified could be a software change or parameter change, for example. As an example, in cases in which the problem identified (e.g., in problem-solution information 306 or platform device 110) as "RRH restarts with code X" disappears after software 17B.1.1.1 (which can be the corrective configuration or the solution information embodied in the corrective configuration) is loaded in an FFA cell. In this case, the control device 102, platform device 110 or any other network device (e.g., cell site device or EMS device) that detects the change and corresponding fix can automatically add information indicating "RRH restarts with code x=17B.1.1.1" to the repository of platform device 110. For example, the repository 314 can be or include one or more types of information (e.g., device type-problem information 302, historical solution information 304, problem-solution information 306 and/or telemetry information 308), solution information, corrective configurations, software or computer executable code and/or software or computer executable code embodied as one or more corrective configurations.

In some embodiments described herein, the repository 314 can be a knowledge database or knowledge engine. The repository 314 can be hosted by the system 100 and/or the control device 102 or platform device 110. The repository 314 can add a count of the number of network cells (or network cell devices) and/or date of last cell (or network cell device) reporting that confirmed a fix to a particular identified symptom. This system 100 can be seen as both a living system in that it perpetually grows and a learning system in that it is constantly forming new patterns, relationships and action sets.

Turning now to FIG. 6, another example of an identified problem could be "excessive IR.94 video drop rate" for which the correlated solution can be a "packet discard timer change from x to y" applied to a parameter trial cell site.

With reference to FIGS. 5 and 6, an example of requesting a fix can be as follows. If another cell has a chronic issue, the control device 102 and/or the platform device 110 can periodically checks the repository for a problem-solution combination that matches its chronic issue. In the example above, if the cell site has a chronic issue called "RRH restarts with code x" the control device 102 and/or platform device 110 is going to find "17B.1.1.1" software as the solution. If the "RRH restarts with code x" symptom has multiple solutions then some combination of fix age and fix count can be used to decide which solution to apply first. In this case the cell device can submit a "solution scheduling request" to load "17B.1.1.1 software" and this request can also include the chronic failure rate (x fails/day) for prioritization. Tremendous organizational and/or system learning can be inculcated in the solution scheduling request. For instance, a cell site device can be soft locked to prohibit any further user traffic originations or hand-ins. Over the ensuing few minutes, that cell site device can take itself out of service and apply the scheduled solution with minimal subscriber impact. Additionally, some solutions require the cell site device to be restarted and some do not. In some embodiments, the system 100 could be configured to employ human interaction for the first n number of requests and then go fully automatic thereafter.

An example of deployment of a fix can be as follows. The control device 102 and/or platform device 110 can categorize each solution as "immediate" (parameters that require no restart) or "maintenance window" (service impacting changes like software load). The system 100, control device 102 and/or platform device 110 can build and sort a list of cells requiring each solution. In some embodiments, the sorting can be according to frequency as reported in above in the Request Fix process employed to request a fix and noted above. If the solution is "immediate" (for example, a new Gold Standards approved packet discard timer), then the control device 102 and/or platform device 110 can initiate parameter change soon after fix is requested. If the solution is "maintenance window" then the control device 102, platform device 110 and/or device 106 can work down the list of cells (ranked according to chronic failure rate) until empty. In this example, the control device 102, platform device 110 and/or device 106 can fills the daily limit of cells requiring the example "17B.1.1.1" software update during the next maintenance window. Further, there are concomitant systems that evaluate a given cell site's coverage morphology (for instance, a single cell site serving a rural town, a cell site covering a hospital or Emergency Operations Center, etc.). The control device 102, platform device 110 and/or device 106 can have the ability to incorporate this ancillary information as a further mechanism to inculcate organizational knowledge, thus making the control device 102, platform device 110 and/or device 106 smarter still.

In some embodiments, the confirmation of the fix can be repeated. As per the steps of confirming fix, requesting a fix then deploying a fix, the cell and control device 102, platform device 110 and/or device 106 can identify, request and/or deploy solutions. In some embodiments, for example, a deployed can include, but is not limited to, invoking subroutines (e.g., set Soft Lock on a site to allow no new traffic on site and eventually allow site to dry out (have all connectivity be moved to another site) before the fix is implemented); and/or invoking a manual or an automated subroutine where some fixes are automatically applied while others employ operator, control device 102 and/or platform device 110 approval.

After solutions have been deployed to a cell, for example, that cell will likely notice an improvement in the specific performance area under consideration. In this case this cell will report a confirmed fix to the repository 314 and the confirmed fix counter can be incremented for the associated combination of problem and solution in the repository 314. Over time the confirmed fix counter and date fields (on the repository 314) can improve the selection and rate of first-attempt fixes for other cells (with the same chronic failures) that follow.

Beyond the actually efficacy of the fix content, valuable business knowledge will also be generated. Suppliers have performance targets and must pay liquidated damages if they fail to meet them. One of the performance targets is the percentage of time a chronic defect is solved the first time a corrective configuration is applied. The proposed system automates the collection and evaluation of that critical business knowledge. The proposed system will provide faster, more automated and less disputable information on a given system's actual performance well as the timeliness and effectiveness of a given supplier's software corrections.

In some embodiments, the system 100 and/or components of the integral part of networks as virtualization becomes more widespread (e.g., Network Function Virtualization) of the OSS+EMS. This could also interact with Self Optimizing Network software from third-party companies. In some embodiments, the immediately, this can be provided as part of the OSS and EMS manufacturers. Longer term, any system operator where chronic defects have to be monitored, assessed and intelligence applied by the control device 102, platform device 110 and/or device 106 as to what solutions to apply and how to apply those solutions and then assess the efficacy of the applied solution.

FIGS. 7, 8, 9, 10, 11 and 12 illustrate flowcharts of methods that facilitate prediction, detection and mitigation of network or device issues in a communication system in accordance with one or more embodiments described herein.

Figure 7:
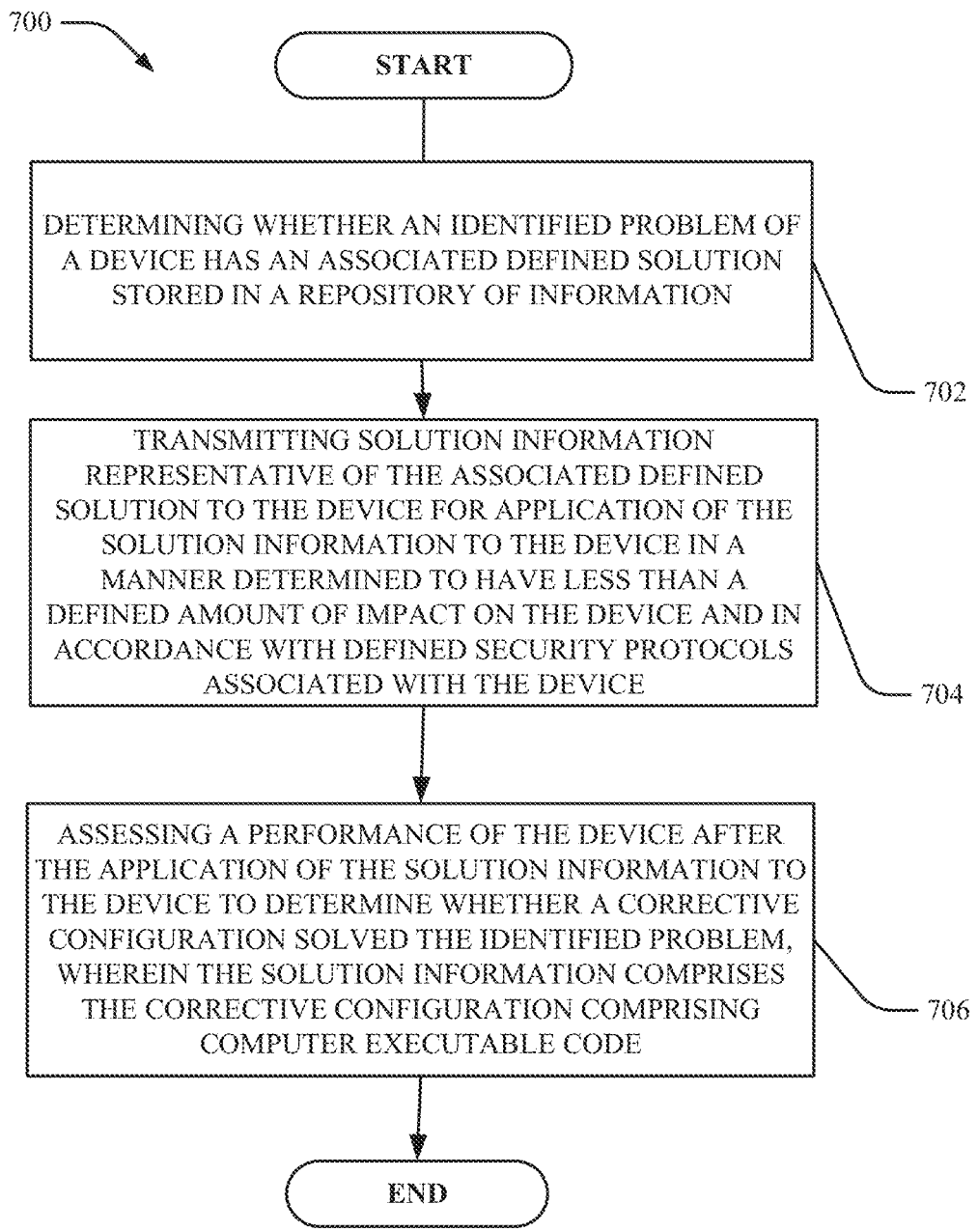
FIGS. 7, 8, 9, 10, 11 and 12 illustrate flowcharts of methods that facilitate prediction, detection and mitigation of network or device issues in a communication system in accordance with one or more embodiments described herein.

Turning first to FIG. 7, at 702, method 700 can comprise determining, by a device comprising a processor, whether an identified problem of a device has an associated defined solution stored in a repository of solution information. At 704, method 700 can comprise transmitting solution information representative of the associated defined solution to the device for application of the solution information to the device in a manner determined to have less than a defined amount of impact on the device and in accordance with defined security protocols associated with the device. For example, in some embodiments, what might be deemed of little impact for one network could be very significant for another network. By way of example, what may be deemed least impactful, for instance, for AT&T during the Super Bowl might be far different from a lower tier operator in a third world country during a routine network event.

At 706, method 700 can comprise assessing a performance of the device after the application of the solution information to the device to determine whether a corrective configuration solved the identified problem, wherein the solution information comprises the corrective configuration comprising computer executable code.

In some embodiments, although not shown, assessing the performance comprises: comparing a first performance of the device prior to the transmitting the corrective configuration to a second performance of the device after the transmitting the corrective configuration; and determining whether the second performance of the device more closely satisfies a defined condition for the device than the first performance of the device; and determining that the corrective configuration is a solution for the identified problem based on a determination that the second performance of the device more closely satisfies the defined condition for the device than the first performance of the device.

In some embodiments, the identified problem is associated with fault management, security management and/or capacity management.

Figure 8:
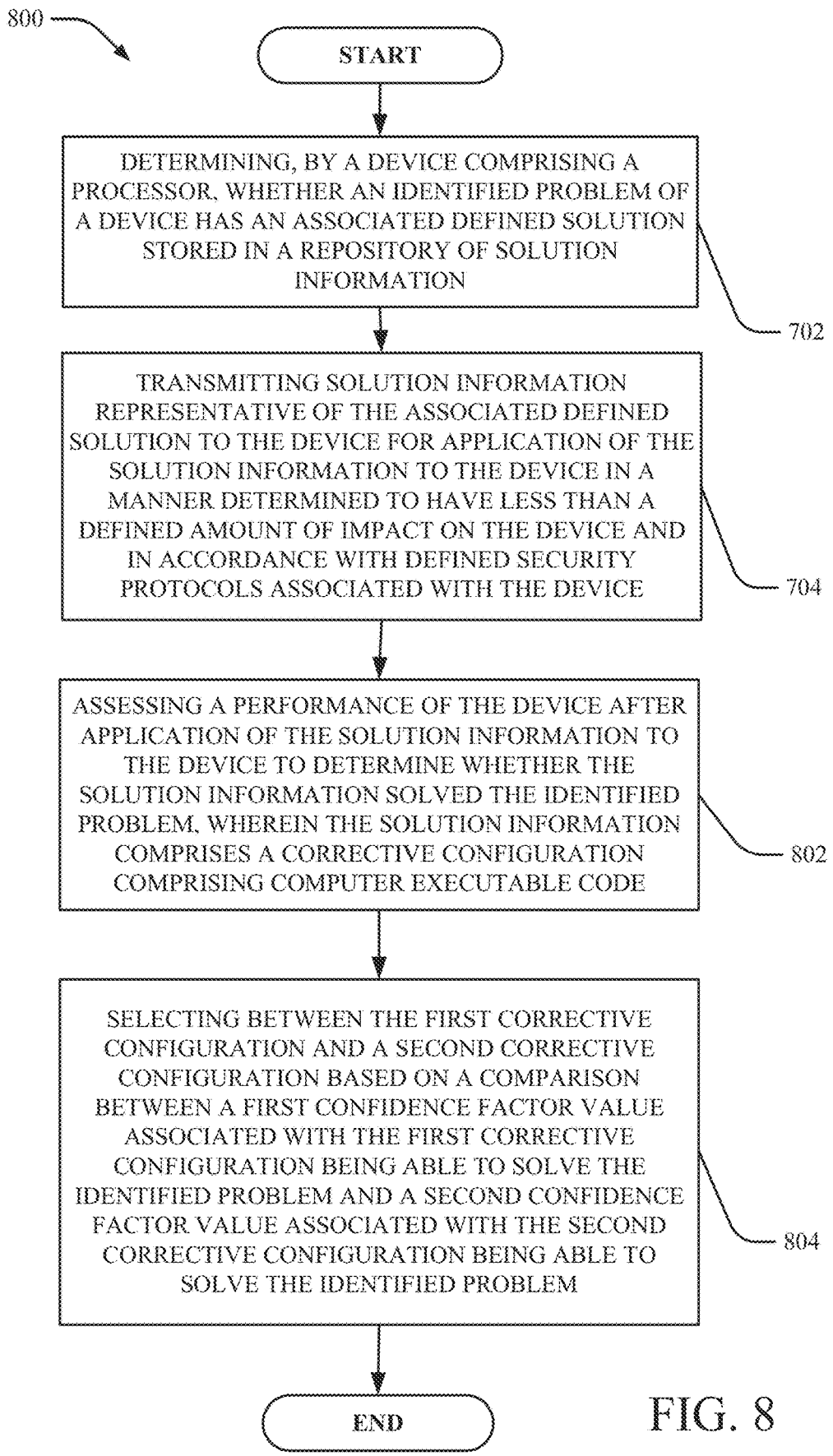

Turning to FIG. 8, method 800 can comprise 702 and 704 of method 700. Method 800 can also comprise assessing a performance of the device after application of the solution information to the device to determine whether the solution information solved the identified problem, wherein the solution information comprises a corrective configuration comprising computer executable code. At 804, method 800 can comprise selecting between the first corrective configuration and a second corrective configuration based on a comparison between a first confidence factor value associated with the first corrective configuration being able to solve the identified problem and a second confidence factor value associated with the second corrective configuration being able to solve the identified problem.

In some embodiment, although not shown, method 700 and/or method 800 can comprise: monitoring a trend of a metric value associated with performance of the device; and predicting that the device will have the identified problem prior to the identified problem occurring based on the monitoring the trend.

Figure 9:
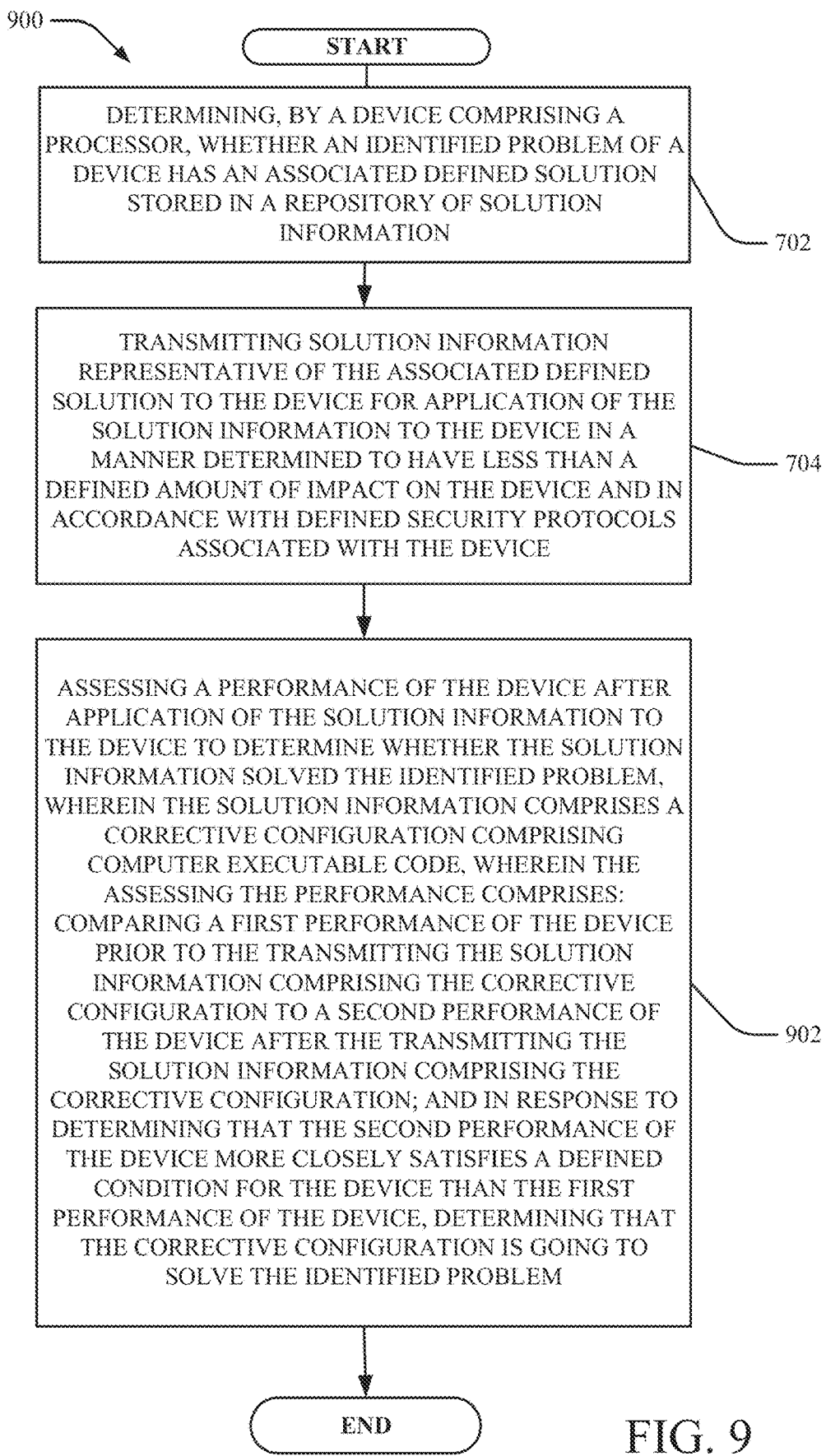

Turning to FIG. 9, method 900 can comprise 702 and 704 of method 700. Method 900 can also comprise assessing a performance of the device after application of the solution information to the device to determine whether the solution information solved the identified problem, wherein the solution information comprises a corrective configuration comprising computer executable code. The assessing the performance can comprise: comparing a first performance of the device prior to the transmitting the solution information comprising the corrective configuration to a second performance of the device after the transmitting the solution information comprising the corrective configuration; and in response to determining that the second performance of the device more closely satisfies a defined condition for the device than the first performance of the device, determining that the corrective configuration is going to solve the identified problem.

Figure 10:
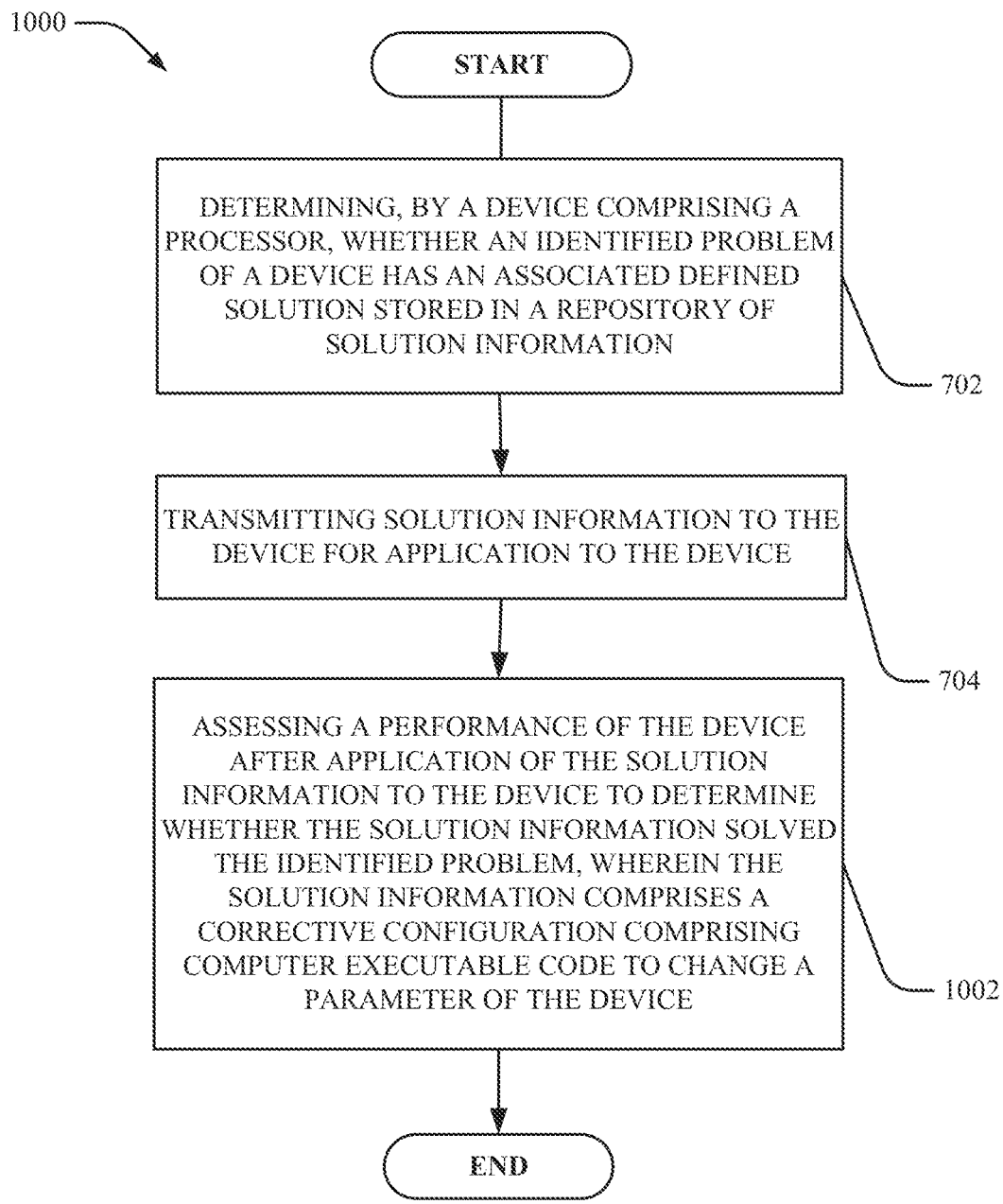

Turning to FIG. 10, method 1000 can comprise 702 and 704 of method 700. Method 1000 can comprise assessing, by the device, a performance of the device after the application of the solution information to the device to determine whether a corrective configuration included in the solution information solved the identified problem.

Figure 11:
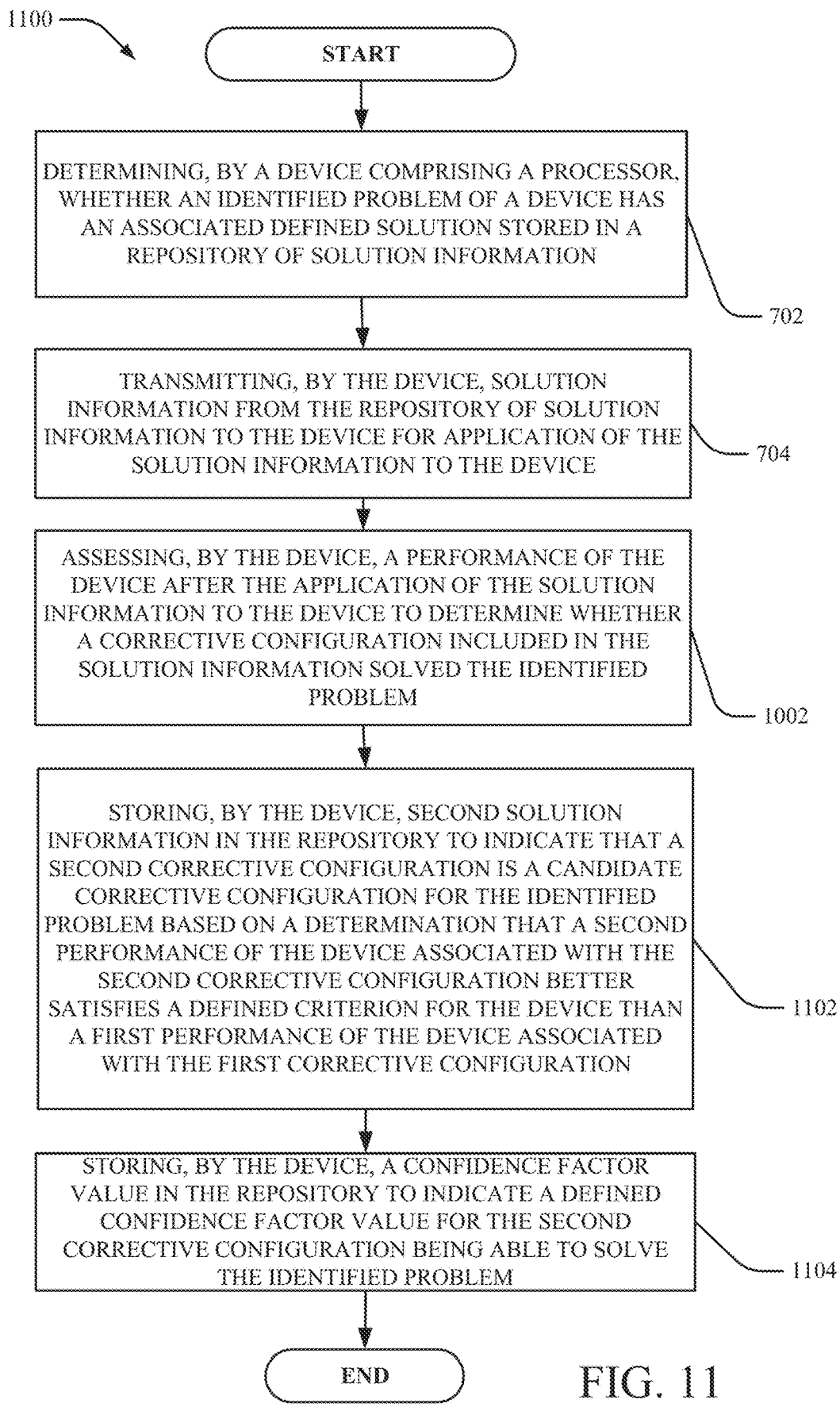

Turning to FIG. 11, method 1000 can comprise 702 and 704 of method 700. Method 1100 can also comprise 1002 of method 1000. Further, at 1102, method 1100 can comprise storing, by the device, second solution information in the repository to indicate that a second corrective configuration is a candidate corrective configuration for the identified problem based on a determination that a second performance of the device associated with the second corrective configuration better satisfies a defined criterion for the device than a first performance of the device associated with the first corrective configuration. At 1104, method 1100 can comprise storing, by the device, a confidence factor value in the repository to indicate a defined confidence factor value for the second corrective configuration being able to solve the identified problem.

Although not shown, in one or more embodiments, FIGS. 7, 8, 9, 10 and/or 11 can comprise updating information of the repository to indicate that the second corrective configuration is a candidate corrective configuration for the identified problem based on the determination that the second performance of the device more closely satisfies the defined condition for the device than the first performance of the device, wherein the repository stores corrective configurations.

One or more embodiments of FIGS. 7, 8, 9, 10 and/or 11 can comprise storing a confidence factor value in the repository to indicate that the second corrective configuration has a defined confidence factor value for the identified problem. In some embodiments, the confidence factor value for the second corrective configuration is based on how well the second corrective configuration satisfies the defined condition for the device. In one or more embodiments, the repository comprises: first previous solution information applied to particular types of devices; second previous solution information applied to particular brands of devices; third previous solution information applied during a defined event; fourth previous solution information applied during a defined condition; or fifth previous solution information applied during the identified problem.

In some embodiments of one or more of the methods of FIGS. 7, 8, 9, 10 and/or 11 the device comprises a mobile device, a network device and/or an IoT device.

Although not shown, in some embodiments, one or more of the methods of FIGS. 7, 8, 9, 10 and/or 11 can also comprise cataloging in the repository a change that occurred, in a network to which the device is communicatively coupled, within a defined amount of time, before or after a time that the identified problem was resolved. In some embodiments, the method also comprises generating a list of network devices to which to deploy the corrective configuration based on the change identified and a condition of the network devices. In some embodiments, the method also comprises receiving a request transmitted from a second device for the apparatus to apply the solution information to the second device based on the second device matching, in the repository, the identified problem with a condition of the second device.

In some embodiments, the repository comprises an open source repository accessible by third-parties to allow the third-parties to add and access the identified problem and the solution information for the identified problem, in full compliance with the defined security protocols of the network operator, control device 102, platform device 110 and/or system 100.

Figure 12:
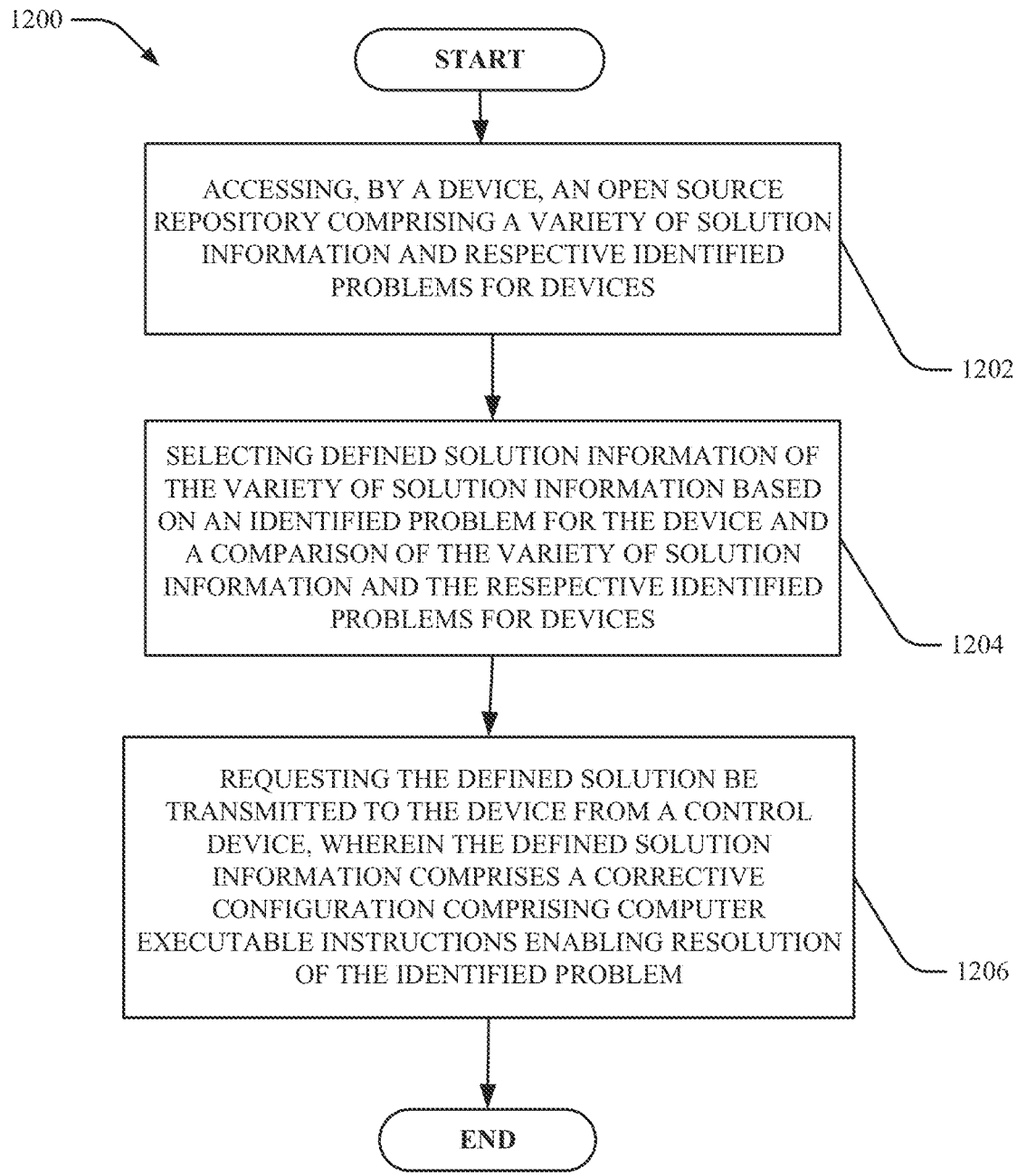

Turning now to FIG. 12, method 1200 can comprise accessing an open source repository comprising a variety of solution information and respective identified problems for devices at 1202. At 1204, method 1200 can comprise selecting defined solution information of the variety of solution information based on an identified problem for the device and a comparison of the variety of solution information and the respective identified problems for devices. At 1206, method 1200 can comprise requesting the defined solution to be transmitted to the device from a control device, wherein the defined solution information comprises a corrective configuration comprising computer executable instructions enabling resolution of the identified problem.

Figure 13:
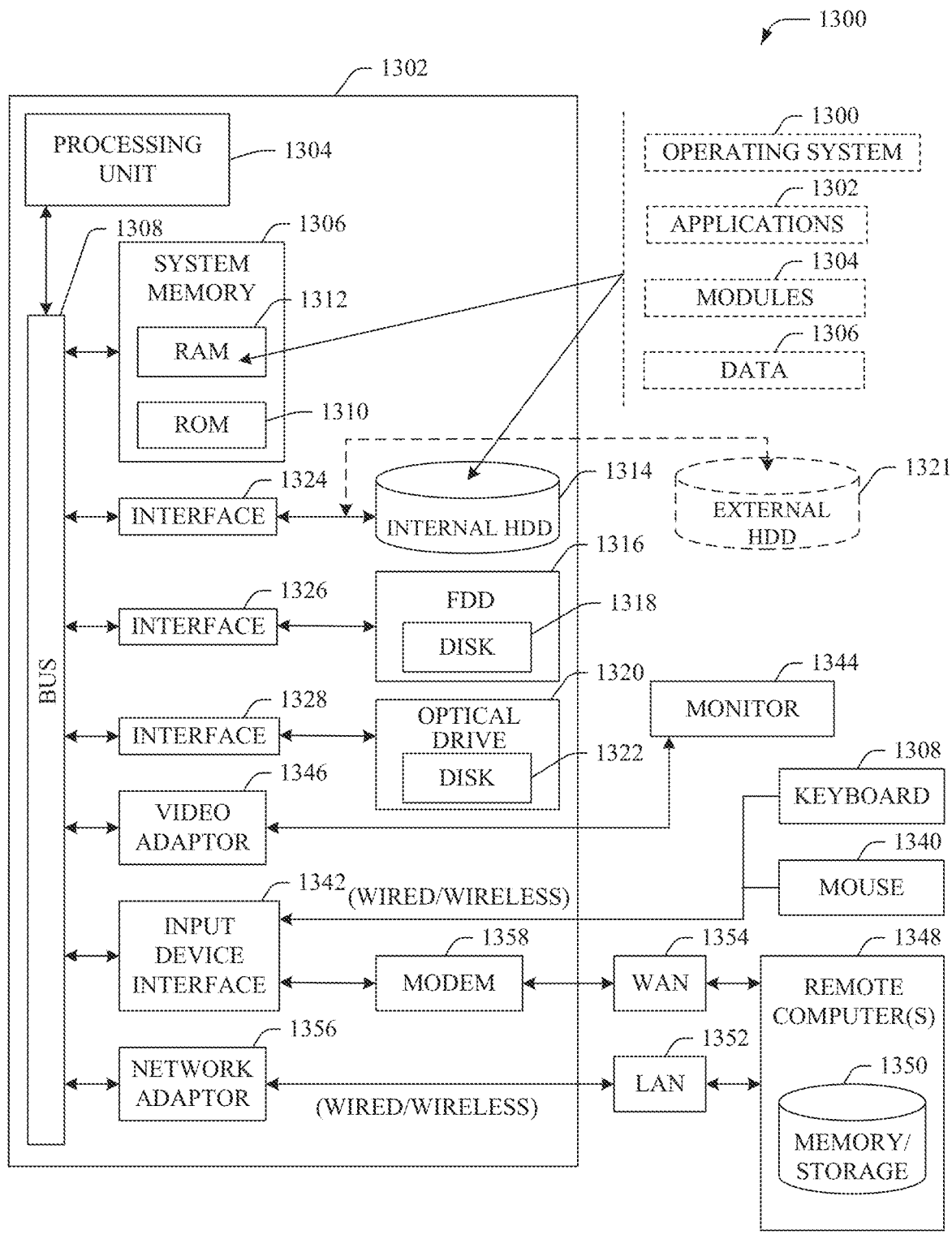
FIG. 13 illustrates a block diagram of a computer that can be employed in accordance with one or more embodiments described herein.

FIG. 13 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, control device 102, platform device 110, mobile devices 104, 106 and/or IoT device 108 (or a component of control device 102, platform device 110, mobile devices 104, 106 and/or IoT device 108). In order to provide additional text for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 13, the example environment 1300 for implementing various embodiments of the embodiments described herein comprises a computer 1302, the computer 1302 comprising a processing unit 1304, a system memory 1306 and a system bus 1308. The system bus 1308 couples system components comprising, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 comprises ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also comprise a high-speed RAM such as static RAM for caching data.

The computer 1302 further comprises an internal hard disk drive (HDD) 1310 (e.g., EIDE, SATA), which internal hard disk drive 1314 can also be configured for external use in a suitable chassis (not shown), a magnetic floppy disk drive 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface, respectively. The interface 1324 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1302, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, comprising an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A communication device can enter commands and information into the computer 1302 through one or more wired/wireless input devices, e.g., a keyboard 1338 and a pointing device, such as a mouse 1340. Other input devices (not shown) can comprise a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a universal serial bus (USB) port, an IR interface, etc.

A monitor 1344 or other type of display device can be also connected to the system bus 1308 via an interface, such as a video adapter 1346. In addition to the monitor 1344, a computer typically comprises other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically comprises many or all of the elements described relative to the computer 1302, although, for purposes of brevity, only a memory/storage device 1350 is illustrated. The logical connections depicted comprise wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also comprise a wireless AP disposed thereon for communicating with the wireless adapter 1356.

When used in a WAN networking environment, the computer 1302 can comprise a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.11 or Ethernet). Wi-Fi networks operate in the unlicensed 2.4 and 5 GHz radio bands, at an 11 Mbps (802.11a), 54 Mbps (802.11b) and/or 802.11n or 802.ac data rates, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof.

Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
a processor; and
a memory that stores executable instructions that, when executed by the processor, facilitate performance of operations, comprising:
determining whether an identified problem of a device has an associated defined solution, wherein the identified problem is associated with voice services;
transmitting, to the device, solution information representative of the associated defined solution for application of the solution information to the device; and
assessing a performance of the device after the application of the solution information to the device to determine whether a corrective configuration solved the identified problem, wherein the solution information comprises the corrective configuration comprising code executable by the device, wherein assessing the performance comprises:
comparing a first performance of the device, at a first time prior to transmitting the solution information, to a second performance of the device, at a second time after transmitting the solution information; and
in response to determining, according to a defined criterion, that the second performance of the device more closely satisfies a defined condition for the device than the first performance of the device, determining that the corrective configuration is selectable to solve the identified problem.

2. The apparatus of claim 1, wherein the corrective configuration comprises a first corrective configuration, and wherein the operations further comprise:
selecting between the first corrective configuration and a second corrective configuration based on a comparison between a first confidence factor value, associated with the first corrective configuration being determined to solve the identified problem, and a second confidence factor value, associated with the second corrective configuration being determined to solve the identified problem.

3. The apparatus of claim 2, wherein the operations further comprise:
monitoring a trend of a metric value associated with the performance of the device.

4. The apparatus of claim 3, wherein the operations further comprise:
based on a result of the monitoring of the trend, predicting that the device is threshold likely to exhibit the identified problem prior to the identified problem occurring.

5. The apparatus of claim 1, wherein the operations further comprise:
updating information associated with the associated defined solution to indicate that the corrective configuration is a candidate corrective configuration for the identified problem based on the determining, according to the defined criterion, that the second performance of the device more closely satisfies the defined condition for the device than the first performance of the device.

6. The apparatus of claim 5, wherein the operations further comprise:
based on a determination that the identified problem is no longer present, identifying a change that caused the identified problem.

7. The apparatus of claim 1, wherein the operations further comprise:
storing a confidence factor value to indicate that the corrective configuration is associated with a defined confidence factor value for the identified problem, wherein the defined confidence factor value for the corrective configuration is based on a determined extent to which the corrective configuration has satisfied the defined condition for the device.

8. The apparatus of claim 1, wherein the associated defined solution is stored in a repository, and wherein the repository comprises: first previous solution information applied to types of devices, second previous solution information applied to brands of devices, third previous solution information applied during a defined event, fourth previous solution information applied during a previous manifestation of the defined condition, or fifth previous solution information applied as a result of a previous manifestation of the identified problem.

9. The apparatus of claim 1, wherein the device is a mobile device.

10. The apparatus of claim 1, wherein the device is part of network equipment.

11. The apparatus of claim 1, wherein the device is an internet of things device.

12. The apparatus of claim 1, wherein the associated defined solution is stored in a network repository to which the device is communicatively coupled via a network, and wherein the operations further comprise:
cataloging, in the network repository, a change that occurred within an amount of time, wherein the amount of time is defined relative to a time at which the identified problem was resolved.

13. The apparatus of claim 12, wherein the operations further comprise:

identifying a group of network devices to which to deploy the corrective configuration based on the change and respective conditions of the network devices of the group of network devices.

14. The apparatus of claim 1, wherein the device is a first device, and wherein the operations further comprise:
receiving a request from a second device for the apparatus to apply the solution information to the second device based on the second device being determined to match, based on information from a repository, the identified problem with a condition of the second device.

15. The apparatus of claim 1, wherein the operations further comprise storing the solution information representative of the associated defined solution to the identified problem in an open source repository accessible by third-party devices to allow the third-party devices to access the identified problem and the solution information for the identified problem.

16. A method, comprising:
determining, by a first device comprising a processor, whether an identified problem of a second device has an associated defined solution, wherein the identified problem comprises a problem in a streaming video service;
transmitting, by the first device to the second device, solution information representative of the associated defined solution for application of the solution information to the second device; and
assessing, by the first device, a performance of the second device after the application of the solution information to the second device to determine whether a corrective configuration solved the identified problem, wherein the solution information comprises the corrective configuration comprising computer executable code, and wherein assessing the performance comprises:
comparing a first performance of the second device prior to transmitting the solution information to a second performance of the second device after transmitting the solution information; and
in response to determining that the second performance of the second device achieves a defined condition for the second device that is not achieved by the first performance of the second device, determining that the corrective configuration maps to solving the identified problem.

17. The method of claim 16, wherein the associated defined solution is stored in a repository, and wherein the repository comprises an open source repository accessible by third-party devices to enable the third-party devices to add the identified problem and the solution information for the identified problem to the open source repository.

18. The method of claim 16, further comprising:
identifying, by the first device, a group of network devices to which to deploy the corrective configuration based on a condition of the group of network devices and a change that occurred within an amount of time to the group of network devices, wherein the amount of time is defined from before a time that the identified problem was resolved.

19. A non-transitory machine-readable medium, comprising executable instructions that, when executed by a processor, facilitate performance of operations, comprising:
determining whether an identified problem of a device has an associated defined solution associated with a repository of information, wherein the identified problem comprises an event-based problem;
transmitting, to the device, solution information representative of the associated defined solution for application of the solution information to the device; and
assessing a performance of the device after the application of the solution information to the device to determine whether a corrective configuration solved the identified problem, wherein the solution information comprises the corrective configuration comprising computer executable code, wherein assessing the performance comprises:
comparing a first performance of the device, the first performance being from a first time that is prior to transmitting the solution information comprising the corrective configuration, to a second performance of the device according to a defined performance metric, the second performance being from a second time that is after transmitting the solution information comprising the corrective configuration; and
in response to a result of the comparing indicating that the second performance of the device satisfies a defined criterion for the device better than the first performance of the device according to the defined performance metric, determining that the corrective configuration is able to solve the identified problem.

20. The non-transitory machine-readable medium of claim 19, wherein the operations further comprise:
updating information stored in the repository to indicate that the corrective configuration is a candidate corrective configuration for the identified problem based on the result indicating that the second performance of the device satisfies the defined criterion for the device better than the first performance of the device, wherein the repository stores corrective configurations comprising the corrective configuration; and
based on a determination that the identified problem is no longer present, identifying a change that occurred within an amount of time that caused the identified problem, wherein the amount of time is defined from after a time that the identified problem was resolved.

* * * * *